United States Patent
Toyoda

(10) Patent No.: US 10,014,718 B2
(45) Date of Patent: Jul. 3, 2018

(54) UNINTERRUPTIBLE POWER SOURCE

(71) Applicant: TOSHIBA MITSUBISHI-ELECTRIC INDUSTRIAL SYSTEMS CORPORATION, Chuo-ku (JP)

(72) Inventor: Masaru Toyoda, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 43 days.

(21) Appl. No.: 15/315,188

(22) PCT Filed: Jun. 26, 2014

(86) PCT No.: PCT/JP2014/066987
§ 371 (c)(1),
(2) Date: Nov. 30, 2016

(87) PCT Pub. No.: WO2015/198447
PCT Pub. Date: Dec. 30, 2015

(65) Prior Publication Data
US 2017/0163088 A1 Jun. 8, 2017

(51) Int. Cl.
*H02J 9/06* (2006.01)
*H02J 7/00* (2006.01)

(52) U.S. Cl.
CPC ............ *H02J 9/061* (2013.01); *H02J 7/0068* (2013.01)

(58) Field of Classification Search
CPC .......... H02J 9/061; H02J 7/0068; H02J 9/062; H02J 9/06; H02J 7/34
See application file for complete search history.

(56) References Cited

U.S. PATENT DOCUMENTS 7,372,177 B2    5/2008 Colombi et al.
2006/0043797 A1* 3/2006 Hjort ................. H02J 7/0047
                                                        307/46

(Continued)

FOREIGN PATENT DOCUMENTS

WO    WO 2012169046    *  6/2011

OTHER PUBLICATIONS

International Search Report dated Jul. 29, 2014, in PCT/JP2014/066987 filed Jun. 26, 2014.

*Primary Examiner* — Daniel Kessie
*Assistant Examiner* — Terrence Willoughby
(74) *Attorney, Agent, or Firm* — Oblon, McClelland, Maier & Neustadt, L.L.P.

(57) ABSTRACT

When power failure of an AC power source occurs during an eco-mode in which AC power is supplied via a bypass switch, an uninterruptible power source is configured to change over to inverter power supply in which AC power is supplied from an inverter. When turning off the bypass switch during power failure, a power conversion controller is configured to (i) control the converter to invert the DC power output by the battery into AC power and output the AC power to a node, and (ii) control the inverter to invert the DC power output by the battery into AC power and output the AC power to an output terminal. The power conversion controller controls the converter and the inverter such that phase and magnitude of an AC voltage output to the node become equal to phase and magnitude of an AC voltage output to output terminal.

13 Claims, 15 Drawing Sheets

(56) References Cited

U.S. PATENT DOCUMENTS

| | | | |
|---|---|---|---|
| 2012/0013193 A1* | 1/2012 | Sato | H02J 9/062 307/80 |
| 2012/0043818 A1* | 2/2012 | Stratakos | H02J 3/383 307/77 |
| 2012/0218684 A1* | 8/2012 | Andersen | H02J 9/04 361/601 |
| 2014/0097690 A1* | 4/2014 | Costa | H02J 9/00 307/64 |
| 2014/0132074 A1* | 5/2014 | Bush | H02J 9/06 307/66 |
| 2014/0210271 A1* | 7/2014 | Toyoda | H02J 3/46 307/66 |

* cited by examiner

UNINTERRUPTIBLE POWER SOURCE

TECHNICAL FIELD

The present invention relates to an uninterruptible power source, in particular, an uninterruptible power source having an eco-mode in which AC power is supplied to a load via a bypass switch.

BACKGROUND ART

Conventionally, an uninterruptible power source includes: a converter configured to convert AC power from an AC power source into DC power; an inverter configured to convert (i) DC power generated by the converter or DC power of a power storage device into (ii) AC power and supply the AC power to a load; a bypass switch including a thyristor switch and a contactor connected in parallel between the AC power source and the load; and a controller configured to control these.

In the uninterruptible power source, in a normal state in which AC power is normally supplied from the AC power source, the converter and the inverter are used, whereas in a power failure state in which the supply of AC power from the AC power source is stopped, supply of power is continued using the inverter. Such a type of circuit is called "on-line type". In the on-line type, when the AC power source is normal and also when power failure takes place, power is supplied to the load using the inverter via a DC link, so that quality of output power is readily secured irrespective of quality of input power, thus attaining excellent stability of supply of power to the load. Meanwhile, the on-line type has a problem in terms of improvement in operation efficiency because power loss occurs due to energy passing through the converter and the inverter in the normal state.

In recent years, for increase in efficiency, an uninterruptible power source having an eco-mode has been proposed (for example, see U.S. Pat. No. 7,372,177 (Patent Document 1)). According to Patent Document 1, in the normal state, the uninterruptible power source performs bypass power supply to supply AC power from an AC power source to a load via a thyristor switch serving as a bias switch. Moreover, if a malfunction is detected in a bypass path during the execution of the bypass power supply, switching is performed from the bypass power supply to inverter power supply in which AC power is supplied from the inverter to the load.

CITATION LIST

Patent Document

PTD 1: U.S. Pat. No. 7,372,177

SUMMARY OF INVENTION

Technical Problem

In the uninterruptible power source described in Patent Document 1, the converter and the inverter are non-operational during the execution of the bypass power supply. Then, when a control panel detects a malfunction in the bypass path, the thyristor switch serving as a bypass switch is turned off, and the inverter is started with a delay of a predetermined period. Accordingly, when switching from the bypass power supply to the inverter power supply, momentary voltage drop, i.e., momentary drop of voltage output to the load, takes place, disadvantageously.

When a bypass switch is constructed by combining a thyristor switch and a contactor, the contactor is turned off with a delay after the thyristor switch is turned off because response time of the contactor is longer than response time of the thyristor switch. Accordingly, a degree of the momentary voltage drop (time of momentary voltage drop and magnitude of voltage drop) becomes large, with the result that the load may be greatly affected.

In view of this, a main object of the present invention is to provide an uninterruptible power source in which occurrence of momentary voltage drop can be prevented when switching from (i) power supply in an eco-mode in which AC power is supplied to a load via a bypass switch to (ii) inverter power supply.

Solution to Problem

An uninterruptible power source according to the present invention is connected between (i) each of an AC power source and a bypass AC power source and (ii) a load. The uninterruptible power source includes: an input terminal configured to receive AC power from the AC power source; a bypass terminal configured to receive AC power from the bypass AC power source; an output terminal configured to output AC power to the load; a converter configured to rectify the AC power provided to the input terminal into DC power; an inverter configured to invert DC power output by the converter or DC power output by a power storage device into AC power, and to output the AC power to the output terminal; a power conversion controller configured to control the power conversion in each of the converter and the inverter; a bypass switch having one terminal connected to the output terminal; a first switch connected between the bypass terminal and the other terminal of the bypass switch; a second switch connected between (i) a first node located between the input terminal and an AC terminal of the converter and (ii) the other terminal of the bypass switch; a third switch connected between the input terminal and the first node; and a switching controller configured to control on/off of the bypass switch and the first to third switches. The uninterruptible power source has (i) a first operation mode in which AC power is supplied from the inverter to the load and (ii) a second operation mode in which AC power is supplied from the AC power source or the bypass AC power source to the load via the bypass switch. The uninterruptible power source is configured to change over to the first operation mode when power failure occurs to stop supply of the AC power from the AC power source or the bypass AC power source while the second operation mode is selected. While the second operation mode is selected, the switching controller is configured to (i) turn on the bypass switch, the second switch, and one of the first and third switches in a normal state in which the AC power is normally supplied from the AC power source or the bypass AC power source, and (ii) turn off the bypass switch during the power failure, When turning off the bypass switch by the switching controller, the power conversion controller is configured to (i) control the converter to invert the DC power output by the power storage device into AC power and output the AC power to the first node, (ii) control the inverter to invert the DC power output by the power storage device into AC power and output the AC power to the output terminal, and (iii) control the inversions in the converter and the inverter such that phase and magnitude of an AC voltage output to the first node become equal to phase and magnitude of an AC voltage output to the output terminal.

Preferably, the bypass switch includes a contactor having one terminal connected to the output terminal and having the other terminal connected to the first and second switches.

Preferably, in the second operation mode, the switching controller is configured to supply the load with the AC power supplied from the AC power source by turning on the bypass switch and the second and third switches and turning off the first switch.

Preferably, when turning off the bypass switch by the switching controller, the power conversion controller is configured to control the inversion in the converter to synchronize the AC voltage output to the AC terminal of the converter to the AC voltage having been supplied from the AC power source before the power failure. Further, the power conversion controller is configured to control the inversion in the converter to synchronize the AC voltage output to the output terminal to the AC voltage having been supplied from the AC power source before the power failure.

Preferably, the power conversion controller is configured to generate a gate signal for controlling the inverter to synchronize the AC voltage output to the output terminal to the AC voltage supplied from the AC power source. In the second operation mode, the power conversion controller is configured to (i) bring the inverter into an inversion standby state by stopping output of the gate signal in the normal state, and (ii) output the gate signal to the inverter when turning off the bypass switch by the switching controller.

Preferably, when power recovery occurs to resume the supply of the AC power from the AC power source after changing over to the first operation mode, the uninterruptible power source is configured to return to the second operation mode. In response to detecting the power recovery of the AC power source, the power conversion controller is configured to control the converter to perform the rectification and control the inversion in the inverter to synchronize the AC voltage output to the output terminal to the AC voltage supplied from the AC power source after the power recovery. The switching controller is configured to turn on the bypass switch when the AC voltage output to the output terminal synchronizes to the AC voltage supplied from the AC power source after the power recovery.

Preferably, in the second operation mode, the switching controller is configured to supply the load with the AC power supplied from the bypass AC power source by turning on the bypass switch and the first and second switches and turning off the third switch.

Preferably, when turning off the bypass switch by the switching controller, the power conversion controller is configured to control the inversion in the converter to synchronize the AC voltage output to the AC terminal of the converter synchronizes to the AC voltage having been supplied from the bypass AC power source before the power failure. Further, the power conversion controller is configured to control the inversion in the inverter to synchronize the AC voltage output to the output terminal to the AC voltage having been supplied from the bypass AC power source before the power failure.

Preferably, the power conversion controller is configured to generate a gate signal for controlling the inverter to synchronize the AC voltage output to the output terminal to the AC voltage supplied from the bypass AC power source. In the second operation mode, the power conversion controller is configured to (i) bring the inverter into an inversion standby state by stopping output of the gate signal in the normal state, and (ii) output the gate signal to the inverter when turning off the bypass switch by the switching controller.

Preferably, when power recovery occurs to resume the supply of the AC power from the bypass AC power source after changing over to the first operation mode, the uninterruptible power source is configured to return to the second operation mode. In response to detecting the power recovery of the bypass AC power source, the power conversion controller is configured to control the converter to perform the rectification and control the inversion in the inverter to synchronize the AC voltage output to the output terminal to the AC voltage supplied from the bypass AC power source after the power recovery. The switching controller is configured to turn on the bypass switch when the AC voltage output to the output terminal synchronizes to the AC voltage supplied from the bypass AC power source after the power recovery.

Preferably, the uninterruptible power source further includes a reactor having one terminal connected to the input terminal and having the other terminal connected to the AC terminal of the converter. The first node is located between the other terminal of the reactor and the AC terminal of the converter.

Preferably, the uninterruptible power source further includes a reactor having one terminal connected to the input terminal and having the other terminal connected to the AC terminal of the converter. The first node is located between the input terminal and the one terminal of the reactor.

Preferably, the uninterruptible power source further includes: a first transformer connected between the AC power source and the input terminal; and a second transformer connected between the bypass AC power source and the bypass terminal.

Advantageous Effects of Invention

According to the present invention, in the uninterruptible power source having the eco-mode in which AC power is supplied to the load via the bypass switch, occurrence of momentary voltage drop can be prevented upon switching from the power supply in the eco-mode to the inverter power supply. Accordingly, the operation efficiency of the uninterruptible power source can be improved while securing stability of supply of power to the load.

DESCRIPTION OF EMBODIMENTS

Figure 1:
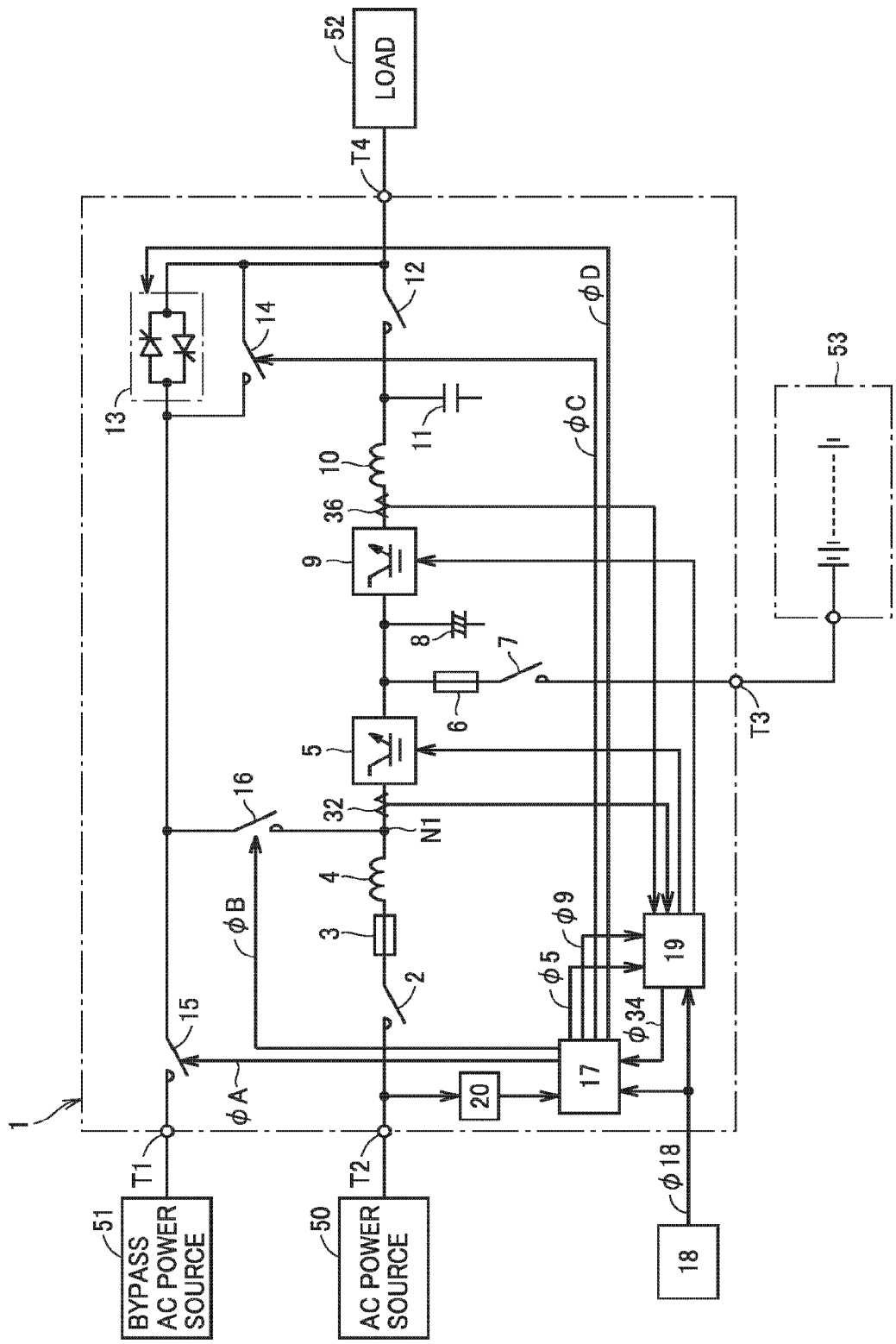
FIG. 1 is an entire configuration diagram of an uninterruptible power source according to a first embodiment of the present invention.

The following describes embodiments of the present invention in detail with reference to figures. It should be noted that the same or corresponding components will be given the same reference characters and will not be described repeatedly.

[First Embodiment]

FIG. 1 is an entire configuration diagram of an uninterruptible power source according to a first embodiment of the present invention. With reference to FIG. 1, the uninterruptible power source according to the first embodiment of the present invention is connected to an AC power source 50, a bypass AC power source 51, and a load 52.

Each of AC power source 50 and bypass AC power source 51 is an AC power source for supplying AC power to the uninterruptible power source. Each of such AC power sources is constituted of a commercial AC power source or a private power generator, for example. In FIG. 1 and figures described below, a three-phase three-wire type AC power source is illustrated as an exemplary AC power source. For simplicity of the figures and description, FIG. 1 representatively shows only a circuit for one phase. However, the AC power source should not be limited to the three-phase three-wire type AC power source, and may be a three-phase four-wire type power source or a single-phase three-wire type power source, for example.

The uninterruptible power source includes: a housing 1; a main body portion accommodated in housing 1; a battery 53 electrically connected to the main body portion; and a bypass terminal T1, an input terminal T2, a battery terminal T3, and an output terminal T4 each provided in housing 1.

Bypass terminal T1 receives AC power from bypass AC power source 51. Input terminal T2 receives AC power from AC power source 50. Battery terminal T3 is connected to the positive electrode of battery 53. Battery 53 is accommodated in a housing different from housing 1. Load 52 is connected to output terminal T4.

As the main body portion, the uninterruptible power source includes: electromagnetic contactors (contactors) 2, 7, 12, 14, 15, 16; fuses 3, 6; reactors 4, 10; a converter (rectifier) 5; an electrolytic capacitor 8; an inverter 9; a capacitor 11; a thyristor switch 13; a switching controller 17; an eco-mode setting unit 18; a power conversion controller 19; a voltage detection circuit 20; and current transformers 32, 36. Among these, contactor 2, fuse 3, reactor 4, converter 5, inverter 9, reactor 10, and contactor 12 are connected in series between input terminal T2 and output terminal T4.

Contactor 2 is connected to an electric conduction path between input terminal T2 and converter 5. During a normal state in which three-phase AC power is normally supplied from AC power source 50, contactor 2 is closed (on), whereas during maintenance of the uninterruptible power source, contactor 2 is opened (off), for example. Fuse 3 is provided in the electric conduction path between input terminal T2 and converter 5 in order to prevent overcurrent from flowing in from AC power source 50. Reactor 4 is provided to allow AC power from AC power source 50 to pass therethrough and is provided such that a signal having a switching frequency and generated by converter 5 is prevented from being propagated to AC power source 50.

Each of converter 5 and inverter 9 is constituted of a semiconductor switching element. As the semiconductor switching element, an IGBT (Insulated Gate Bipolar Transistor) is used, for example. Moreover, as a method for controlling the semiconductor switching element, PWM (Pulse Width Modulation) control can be applied.

During the normal state, converter 5 converts (rectifies) (i) the three-phase AC power supplied from AC power source 50 into (ii) DC power. The DC power thus generated by converter 5 is supplied to inverter 9 and battery 53. Meanwhile, in the power failure state in which the supply of three-phase AC power from AC power source 50 is stopped, converter 5 is non-operational. However, when power failure occurs during execution of an eco-mode described later, converter 5 converts (inverts) the DC power of battery 53 into three-phase AC power of commercial frequency. That is, converter 5 is configured to bidirectionally convert power. The power conversion by converter 5 during the eco-mode will be described later.

Electrolytic capacitor 8 is connected to the output terminal of converter 5 to smooth output voltage of converter 5. In the normal state, inverter 9 converts (i) the DC power smoothed by electrolytic capacitor 8 into (ii) three-phase AC power of commercial frequency. On the other hand, in the power failure state, inverter 9 converts DC power of battery 53 into three-phase AC power of commercial frequency. The power conversion in each of converter 5 and inverter 9 is controlled by power conversion controller 19.

Reactor 10 and capacitor 11 constitute a filter for removing a component of switching frequency included in the AC power output from inverter 9.

Contactor 12 is on during inverter power supply in which AC power is supplied from inverter 9 to load 52. On the other hand, contactor 12 is off during bypass power supply in which AC power is supplied from bypass AC power source 51 to load 52 via thyristor switch 13 and contactor 14.

Thyristor switch 13 and contactor 14 are connected in parallel between bypass terminal T1 and output terminal T4.

Thyristor switch 13 is on when a control signal φD from switching controller 17 is at the H (logic high) level, and is off when control signal φD is at the L (logic low) level. In response to control signal φD, thyristor switch 13 becomes on only for a predetermined time when changing over from the inverter power supply to the bypass power supply. Contactor 14 is on when control signal φC from switching controller 17 is at the H level, and is off when control signal φC is at the L level. In response to control signal φC, contactor 14 becomes off during the inverter power supply and becomes on during the bypass power supply.

Thyristor switch 13 and contactor 14 constitute a bypass switch. The bypass switch has one terminal connected to output terminal T4. Contactor 15 is connected between bypass terminal T1 and the other terminal of the bypass switch. Contactor 15 is on when control signal φA from switching controller 17 is at the H level, and is off when control signal φA is at the L level.

Contactor 16 is connected between (i) a node (first node) N1 located between input terminal T2 and the AC terminal of converter 5 and (ii) the other terminal of the bypass switch. Contactor 16 is on when control signal φB from switching controller 17 is at the H level, and is off when control signal φB is at the L level.

Battery 53 is a power storage device for supplying DC power to inverter 9 during power failure. In the normal state, battery 53 stores DC power generated by converter 5. Fuse 6 and contactor 7 are connected in series between the DC side terminal of converter 5 and battery terminal T3. Contactor 7 is on in the normal state, and is turned off upon maintenance of the uninterruptible power source and battery 53, for example. Fuse 6 prevents overcurrent from flowing into converter 5 and battery 53.

Figure 2:
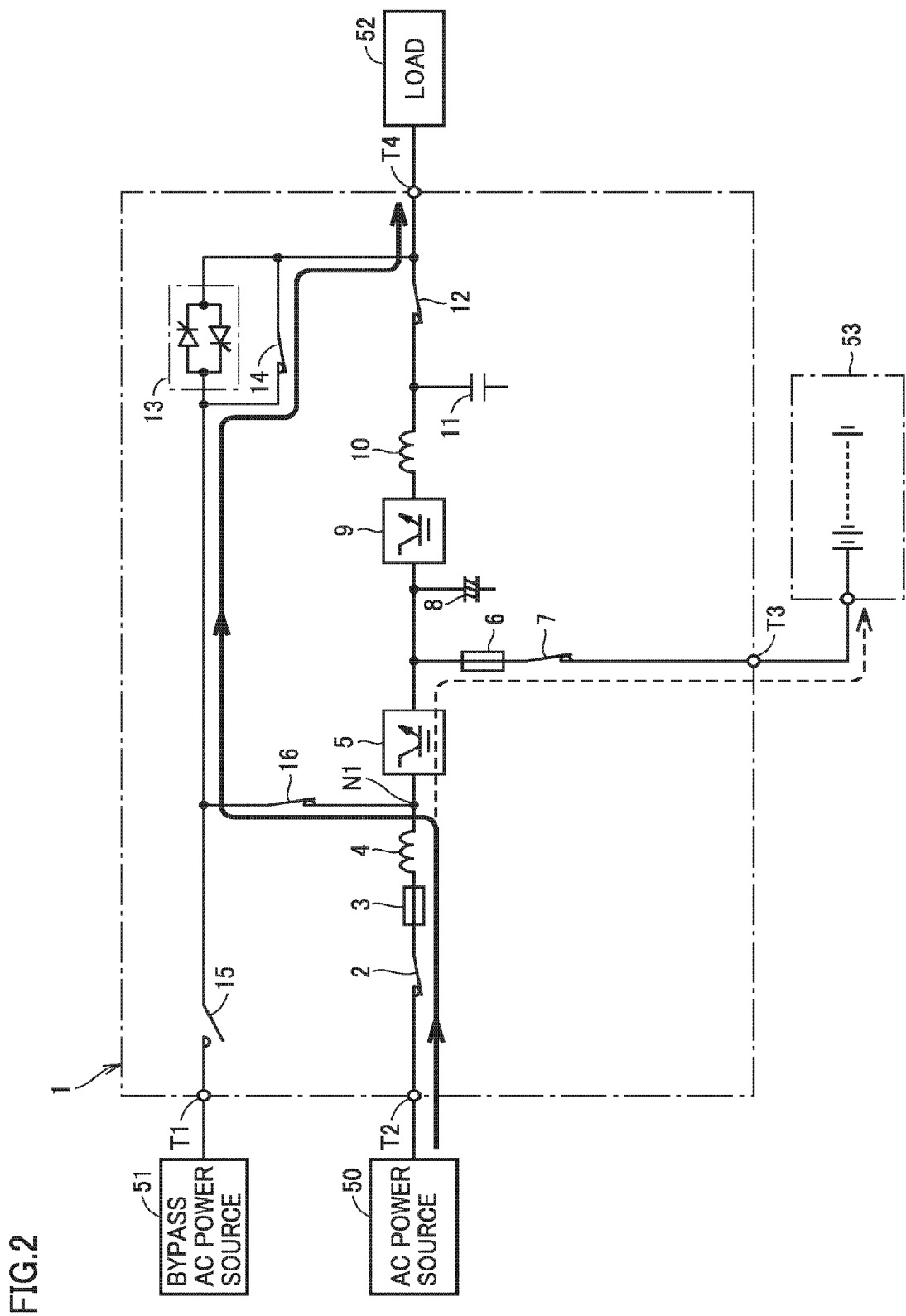
FIG. 2 illustrates a flow of power during execution of an eco-mode.

The uninterruptible power source according to the first embodiment of the present invention has the eco-mode as an operation mode. The eco-mode is an operation mode in which high operation efficiency of the uninterruptible power source is considered as being important in the normal state in which three-phase AC power is normally supplied from AC power source 50. FIG. 2 illustrates a flow of power during execution of the eco-mode.

Generally, in the normal state, the uninterruptible power source is configured such that converter 5 converts (i) three-phase AC power supplied from AC power source 50 into (ii) DC power and inverter 9 converts the DC power into three-phase AC power and supplies it to load 52. Although the above configuration is excellent in terms of stability of supply of power to the load, the configuration has such a problem that it is difficult to achieve high efficiency of the uninterruptible power source due to occurrence of power loss involved in power conversion in each of converter 5 and inverter 9.

In the eco-mode, as indicated by a solid line arrow in FIG. 2, three-phase AC power supplied from AC power source 50 is supplied to load 52 via the bypass switch. That is, the three-phase AC power is supplied to load 52 without passing through converter 5 and inverter 9. Accordingly, power loss is suppressed in converter 5 and inverter 9, thus improving the operation efficiency of the uninterruptible power source. It should be noted that also during the execution of the eco-mode, converter 5 is operated as required, whereby DC power can be stored in battery 53 as indicated by a dotted line arrow in FIG. 2.

With reference to FIG. 1 again, eco-mode setting unit 18 receives, from a high-order controller (not shown), an eco-mode operation command for requesting execution of the eco-mode. The eco-mode may be requested in the following manner: for example, a switch for requesting the eco-mode is provided at an external portion of housing 1, and the eco-mode operation command is activated when this switch is turned on by the user. Alternatively, the eco-mode operation command may be automatically activated in accordance with a predetermined schedule or the like without providing the switch or the like.

When the eco-mode operation command is received, eco-mode setting unit 18 sets the operation mode of the uninterruptible power source at the eco-mode. Eco-mode setting unit 18 generates an eco-mode setting signal φ18 indicating that the operation mode has been set at the eco-mode, and outputs generated eco-mode setting signal φ18 to switching controller 17 and power conversion controller 19.

When eco-mode setting signal φ18 is received from eco-mode setting unit 18, switching controller 17 switches the operation mode to the eco-mode from the normal mode in which the three-phase AC power from AC power source 50 is supplied to load 52 via converter 5 and inverter 9. Specifically, when eco-mode setting signal φ18 is received, switching controller 17 controls contactors 14, 15, 16 and thyristor switch 13 to form a power path between AC power source 50 and load 52 as shown in FIG. 2. Switching controller 17 sets control signals φB, φC, φD at the H level to turn on contactors 16, 14 and thyristor switch 13.

The response time of thyristor switch 13 is very short, so that thyristor switch 13 immediately becomes on when control signal φC is set at the H level. On the other hand, the response time of contactor 14 is longer than the response time of thyristor switch 13, so that contactor 14 actually becomes on after passage of a predetermined response time from the setting of control signal φD at the H level. After contactor 14 becomes on, switching controller 17 sets control signal φD at the L level to turn off thyristor switch 13. Accordingly, the three-phase AC power supplied from AC power source 50 passes through reactor 4 and then is led to output terminal T4 via node N1 and contactor 14.

When the eco-mode setting signal is received from eco-mode setting unit 18, power conversion controller 19 operates converter 5 to store DC power in battery 53. Specifically, power conversion controller 19 controls rectification in converter 5 in accordance with the remaining state of charge in battery 53 in order to bring battery 53 into a predetermined fully charged state.

Further, power conversion controller 19 generates a gate signal for turning on/off a semiconductor switching element included in inverter 9 during the execution of the eco-mode. Power conversion controller 19 generates the gate signal such that three-phase AC voltage synchronized to the three-phase AC voltage supplied from AC power source 50 is output from inverter 9. However, power conversion controller 19 does not output the generated gate signal to the gate drive circuit provided in inverter 9 during the execution of the eco-mode. Hence, inverter 9 is not operated during the execution of the eco-mode, and is therefore in a standby state (gate signal input waiting state) until the gate signal is received from power conversion controller 19.

Voltage detection circuit 20 detects an instantaneous value of the three-phase AC voltage supplied from AC power source 50, and provides switching controller 17 with a signal indicating the detected value. Current transformer 32 detects AC supplied to converter 5, and provides power conversion controller 19 with a signal indicating the detected value. Current transformer 36 detects the AC supplied from inverter 9 to output terminal T4, and provides power conversion controller 19 with a signal indicating the detected value.

During the execution of the eco-mode, switching controller 17 detects power failure of AC power source 50 based on the output signal of voltage detection circuit 20. For example, switching controller 17 detects power failure of AC power source 50 when the effective value of the three-phase AC voltage detected by voltage detection circuit 20 is less than a predetermined threshold value. When the power failure of AC power source 50 is detected, switching controller 17 generates a starting command ϕ9 for starting inverter 9 that is in the standby state. Switching controller 17 outputs generated starting command ϕ9 to power conversion controller 19. When inverter 9 is started in response to this starting command ϕ9, the uninterruptible power source is switched from the power supply in the eco-mode to the inverter power supply.

Here, in order to switch from the power supply in the eco-mode to the inverter power supply, contactor 14 needs to be turned off. Contactor 14 is a mechanical interrupter, and is turned off when a main contact is opened by interrupting electric conduction. Accordingly, after switching controller 17 sets control signal ϕC at the L level, contactor 14 actually becomes off at a timing which comes every half cycle of the AC and at which the current value becomes zero. Thus, since it takes a time to turn off contactor 14, it is difficult to switch to the inverter power supply immediately after the power failure of AC power source 50 is detected. As a result of this, when switching from the power supply in the eco-mode to the inverter power supply, the voltage output to output terminal T4 is dropped momentarily, i.e., momentary voltage drop occurs.

To address this, in the present embodiment, contactor 14 can be turned off in a short time by controlling power conversion in converter 5 and inverter 9 when switching from the power supply in the eco-mode to the inverter power supply. Accordingly, the occurrence of momentary voltage drop is prevented.

Figure 3:
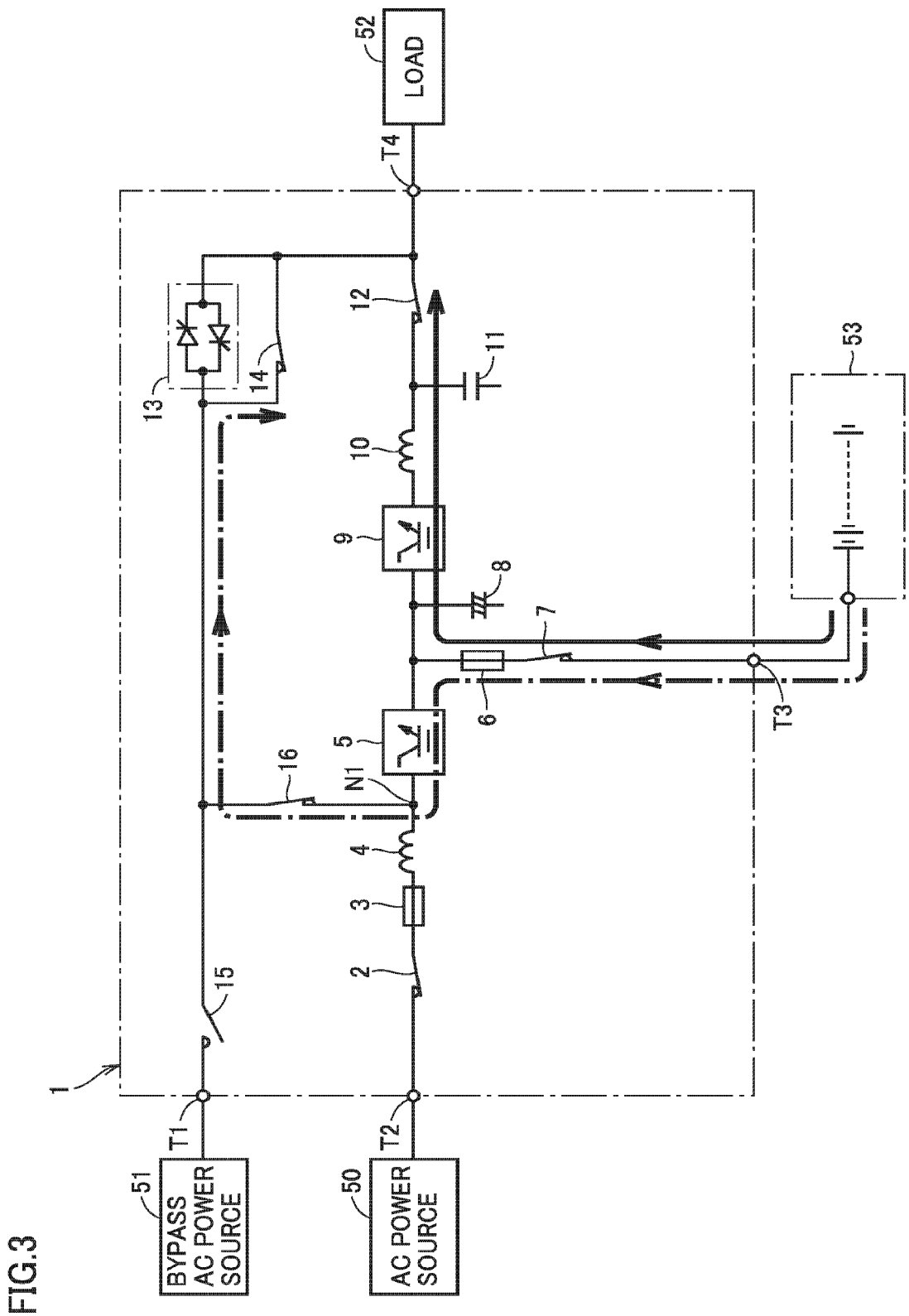
FIG. 3 illustrates a flow of power when power failure of an AC power source is detected during the execution of the eco-mode.

FIG. 3 illustrates a flow of power when the power failure of AC power source 50 is detected during the execution of the eco-mode. With reference to FIG. 3, during the execution of the eco-mode, contactors 16, 14 are turned on in response to control signals from switching controller 17.

When the power failure of AC power source 50 is detected during the execution of the eco-mode, switching controller 17 (FIG. 1) generates an inversion command ϕ5 for causing converter 5 to perform inversion. Switching controller 17 outputs generated inversion command ϕ5 to power conversion controller 19 (FIG. 1). When inversion command ϕ5 is received, converter 5 is switched from the rectification to the inversion. Specifically, as indicated by an alternate long and short dash line arrow in FIG. 3, converter 5 converts (i) the DC power stored in battery 53 into (ii) three-phase AC power of commercial frequency. The three-phase AC power output to the AC terminal of converter 5 is led to contactor 14 via contactor 16.

On this occasion, power conversion controller 19 controls the inversion in converter 5 to synchronize (i) the three-phase AC voltage output to node N1 at the AC side of converter 5 to (ii) the three-phase AC voltage having been supplied from AC power source 50 before the occurrence of the power failure.

Switching controller 17 provides inversion command ϕ5 to converter 5, and provides a starting command ϕ9 to inverter 9 that is in the standby state as described above. When inverter 9 is started in response to this starting command ϕ9, power conversion controller 19 outputs (i) the gate signal generated during the execution of the eco-mode to (ii) a gate drive circuit provided in inverter 9. Each of the semiconductor switching elements included in inverter 9 is turned on/off in accordance with the gate signal. Accordingly, inverter 9 converts the DC power of battery 53 into the three-phase AC power of commercial frequency as indicated by a solid line arrow in FIG. 3. The three-phase AC power output from inverter 9 is supplied to output terminal T4.

Here, contactor 14 is connected to the AC terminal of converter 5 at its primary side, and is connected to the AC terminal of inverter 9 at its secondary side. When converter 5 performs inversion in response to inversion command ϕ5 from switching controller 17, the primary side of contactor 14 is provided with the three-phase AC voltage synchronized to the three-phase AC voltage having been supplied from AC power source 50 before the occurrence of the power failure. On the other hand, when inverter 9 performs inversion in response to starting command ϕ9 from switching controller 17, the secondary side of contactor 14 is provided with the three-phase AC voltage synchronized to the three-phase AC voltage having been supplied from AC power source 50 before the occurrence of the power failure. When the phase and magnitude of the three-phase AC voltage at the primary side is equal to the phase and magnitude of the three-phase AC voltage at the secondary side, contactor 14 is in such a state that electric conduction is substantially interrupted. Accordingly, when control signal ϕD is set at the L level, the main contact is opened immediately to turn off contactor 4.

By interrupting the electric conduction to contactor 14 in this way, contactor 14 is turned off immediately before a predetermined response time from the setting of control signal ϕC at the L level. Therefore, until contactor 14 is turned off, the voltage of output terminal T4 can be maintained at the three-phase AC voltage output from inverter 9. Accordingly, when switching from the power supply in the eco-mode to the inverter power supply, the voltage output to output terminal T4 can be prevented from being dropped momentarily.

It should be noted that after contactor 14 is turned off, power conversion controller 19 stops the operation of converter 5 at a timing at which the AC output from converter 5 reaches the zero point.

Figure 4:
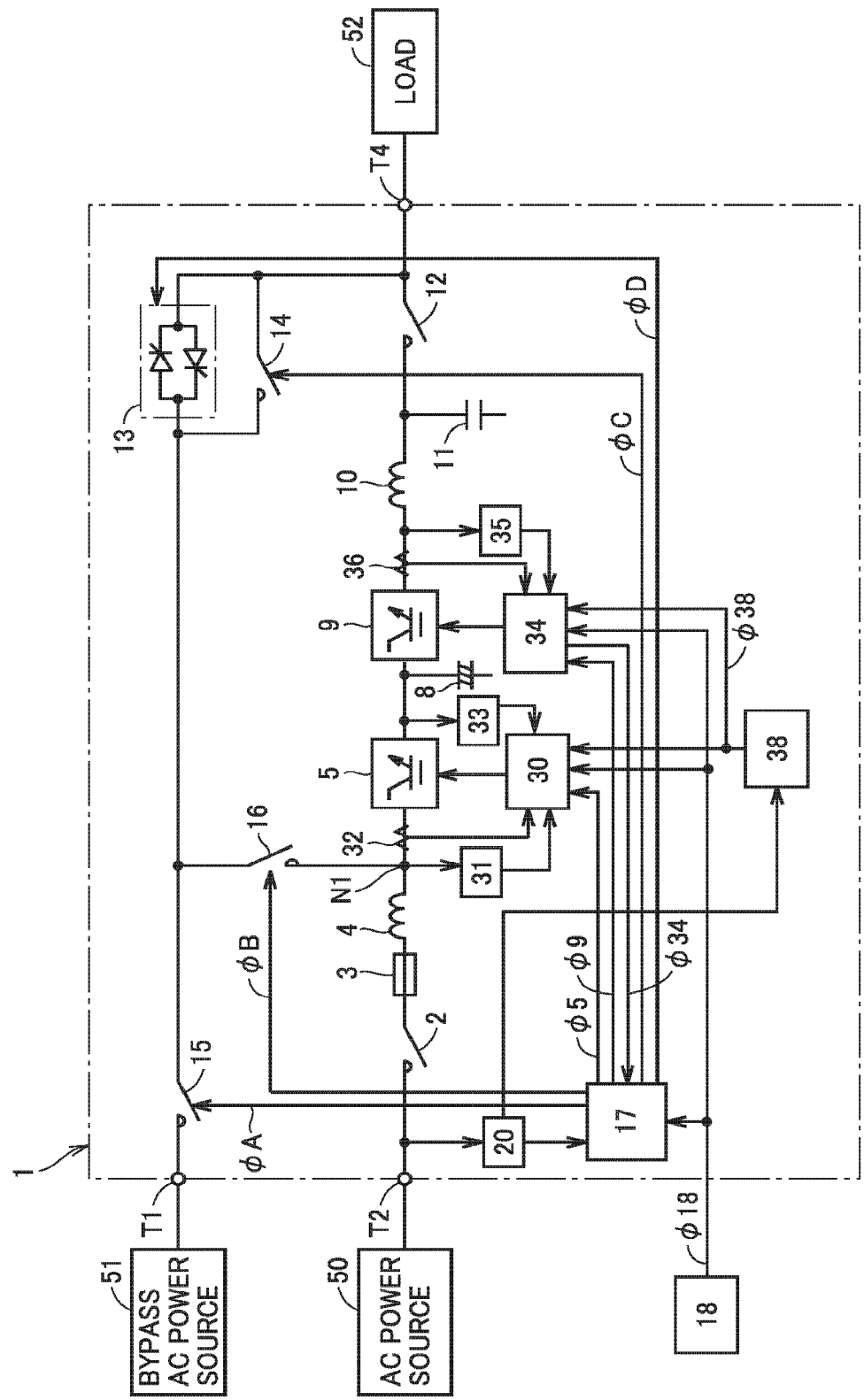
FIG. 4 is a function block diagram showing a control configuration for switching from the power supply in the eco-mode to the inverter power supply in the uninterruptible power source according to the first embodiment of the present invention.

FIG. 4 is a function block diagram showing a control configuration for switching from the power supply in the eco-mode to the inverter power supply in the uninterruptible power source according to the first embodiment of the present invention.

With reference to FIG. 4, power conversion controller 19 includes a converter control circuit 30, an inverter control circuit 34, voltage detection circuits 31, 33, 35, and a sinusoidal wave generation circuit 38.

Voltage detection circuit 31 detects an instantaneous value of the three-phase AC voltage provided to node N1, and provides the detected value to converter control circuit 30. Voltage detection circuit 33 detects a voltage between the terminals of electrolytic capacitor 8, and provides the detected value to converter control circuit 30. When eco-mode setting signal ϕ18 is received from eco-mode setting unit 18, converter control circuit 30 controls, based on the output signals of current transformer 32 and voltage detection circuit 33, the rectification in converter 5 to supply a predetermined DC voltage to battery 53.

Voltage detection circuit 35 detects the instantaneous value of the three-phase AC voltage output from inverter 9, and provides the detected value to inverter control circuit 34.

Based on the output signal of voltage detection circuit 20, sinusoidal wave generation circuit 38 generates a sinusoidal wave signal φ38 having commercial frequency and predetermined amplitude, in synchronization with the three-phase AC voltage supplied from AC power source 50. This predetermined amplitude is set such that the effective value of sinusoidal wave signal φ38 becomes 90% of the rated voltage of AC power source 50, for example. It should be noted that 90% of the rated voltage of AC power source 50 corresponds to a compensation voltage that should be compensated by the uninterruptible power source during power failure. Sinusoidal wave generation circuit 38 provides generated sinusoidal wave signal φ38 to inverter control circuit 34.

When eco-mode setting signal φ18 is received from eco-mode setting unit 18, inverter control circuit 34 controls the inversion in inverter 9 based on (i) the output signals of current transformer 36 and voltage detection circuit 35 and (ii) sinusoidal wave signal φ38 from sinusoidal wave generation circuit 38. Specifically, inverter control circuit 34 generates a current command value based on a deviation between the output signal of voltage detection circuit 35 and sinusoidal wave signal φ38 generated in sinusoidal wave generation circuit 38. Further, when inverter control circuit 34 determines a deviation between the generated current command value and the output signal of current transformer 36, inverter control circuit 34 generates a voltage command value to eliminate the deviation. Based on the generated voltage command value, inverter control circuit 34 performs the PWM control on inverter 9. On this occasion, inverter control circuit 34 controls inverter 9 to synchronize (i) the three-phase AC voltage detected by voltage detection circuit 35 to (ii) the three-phase AC voltage from AC power source 50.

During the execution of the eco-mode, through the PWM control, inverter control circuit 34 generates a gate signal for turning on/off the semiconductor switching element included in inverter 9. However, inverter control circuit 34 does not output the generated gate signal to the gate drive circuit provided in inverter 9. Accordingly, inverter 9 is not operated during the execution of the eco-mode, and is in the inversion standby state (gate signal input waiting state). In this way, during the execution of the eco-mode, converter 5 converts (i) the three-phase AC power from AC power source 50 into (ii) DC power and supplies it to battery 53. On the other hand, inverter 9 is in the standby state.

During the execution of the eco-mode, based on the output signal of voltage detection circuit 20, switching controller 17 determines whether or not power failure of AC power source 50 has occurred. Switching controller 17 detects power failure of AC power source 50 when the effective value of the three-phase AC voltage detected by voltage detection circuit 20 falls below a predetermined threshold value. When the power failure of AC power source 50 is detected, switching controller 17 provides inversion command φ5 to converter control circuit 30. Further, switching controller 17 provides starting command φ9 to inverter control circuit 34.

When inversion command φ5 is received from switching controller 17, converter control circuit 30 controls the inversion in converter 5 based on (i) the output signals of current transformer 32 and voltage detection circuit 31 and (ii) sinusoidal wave signal φ38 from sinusoidal wave generation circuit 38. Specifically, after detecting the power failure of AC power source 50, sinusoidal wave generation circuit 38 generates a sinusoidal wave signal having commercial frequency and predetermined amplitude, in synchronization with the three-phase AC voltage having been supplied from AC power source 50 before the occurrence of the power failure. The predetermined amplitude is set such that the effective value of the sinusoidal wave signal becomes 90% (compensation voltage) of the rated voltage of AC power source 50, for example. Converter control circuit 30 generates a current command value based on a deviation between the output signal of voltage detection circuit 31 and sinusoidal wave signal φ38 generated in sinusoidal wave generation circuit 38. Further, when converter control circuit 30 determines a deviation between the generated current command value and the output signal of current transformer 32, converter control circuit 30 generates a voltage command value to eliminate the deviation. Based on the generated voltage command value, converter control circuit 30 performs the PWM control on the converter 5. On this occasion, converter control circuit 30 controls converter 5 to synchronize (i) the three-phase AC voltage detected by voltage detection circuit 31 to (ii) the three-phase AC voltage having been supplied from AC power source 50 before the occurrence of the power failure.

Through the PWM control, converter control circuit 30 generates a gate signal for turning on/off the semiconductor switching element included in converter 5, and outputs the generated gate signal to the gate drive circuit provided in converter 5. Accordingly, converter 5 converts (i) the DC power stored in battery 53 into (ii) the three-phase AC power of commercial frequency. Node N1 is provided with the three-phase AC voltage that has commercial frequency and predetermined amplitude and that is in synchronization with the three-phase AC voltage having been supplied from AC power source 50 before the occurrence of the power failure. The three-phase AC power supplied to node N1 is led to contactor 14 via contactor 16.

When starting command φ9 is received from switching controller 17, inverter control circuit 34 outputs the gate signal generated through the PWM control during the execution of the eco-mode to inverter 9. Accordingly, inverter 9 converts (i) the DC power stored in battery 53 into (ii) three-phase AC power of commercial frequency. Inverter 9 outputs the three-phase AC voltage that has commercial frequency and predetermined amplitude and that is in synchronization with the three-phase AC voltage having been supplied from AC power source 50 before the occurrence of the power failure. The three-phase AC voltage output from inverter 9 is supplied to output terminal T4.

Switching controller 17 sets control signal φC at the L level to turn off contactor 14. The primary side of contactor 14 is provided, via node N1, with the three-phase AC voltage that has commercial frequency and predetermined amplitude and that is in synchronization with the three-phase AC voltage having been supplied from AC power source 50 before the occurrence of the power failure. On the other hand, the secondary side of contactor 14 is provided, via output terminal T4, with the three-phase AC voltage that has commercial frequency and predetermined amplitude and that is in synchronization with the three-phase AC voltage having been supplied from AC power source 50 before the occurrence of the power failure. Contactor 14 is brought into the state in which the electric conduction is interrupted when the voltage of the primary side becomes equal to the voltage of the secondary side. Accordingly, contactor 14 is turned off immediately after the setting of control signal φC at the L level, before the timing which comes every half cycle of the AC and at which the current value becomes zero. Accordingly, until contactor 14 is turned off, the voltage of output terminal T4 can be maintained at the three-phase AC voltage output from inverter 9. Accordingly, when switching from the power supply in the eco-mode to the inverter power supply, occurrence of momentary voltage drop can be prevented. It should be noted that after contactor 14 is turned off, converter control circuit 30 stops the operation of converter 5 at the timing at which the AC output from converter 5 reaches the zero point.

Figure 5:
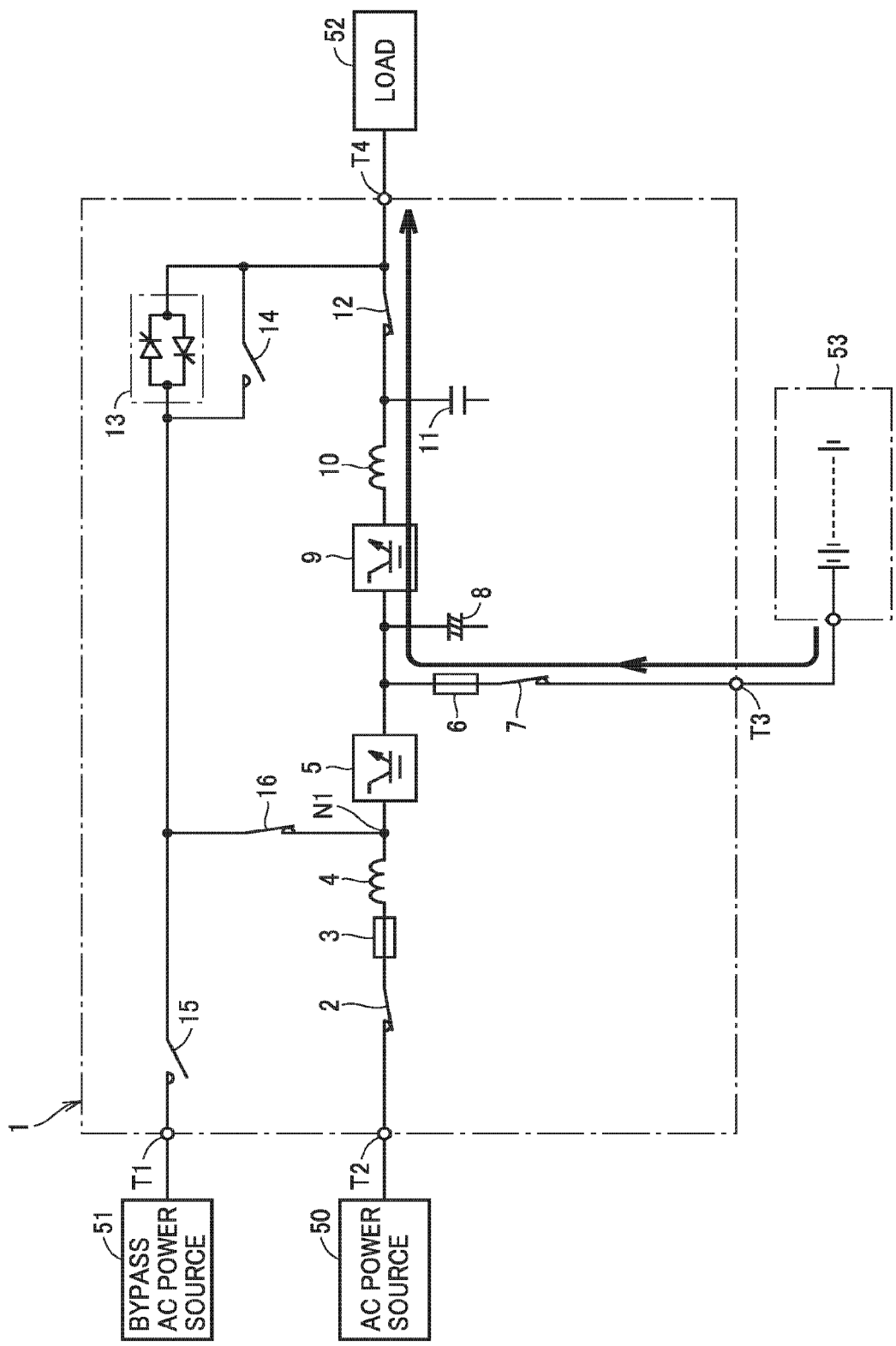
FIG. 5 illustrates a flow of power during the execution of the inverter power supply.

FIG. 5 illustrates a flow of power during the execution of the inverter power supply. With reference to FIG. 5, during the execution of the inverter power supply, in response to the control signal from switching controller 17, contactor 16 is turned on and contactors 15, 14 and thyristor switch 13 are turned off. Inverter 9 converts the DC power of battery 53 into the three-phase AC power of commercial frequency as indicated by a solid line arrow in FIG. 5. Inverter control circuit 34 (FIG. 4) stops the operation of inverter 9 when the remaining state of charges of battery 53 reaches a predetermined lower limit value. Accordingly, the uninterruptible power source ends the inverter power supply.

Figure 6:
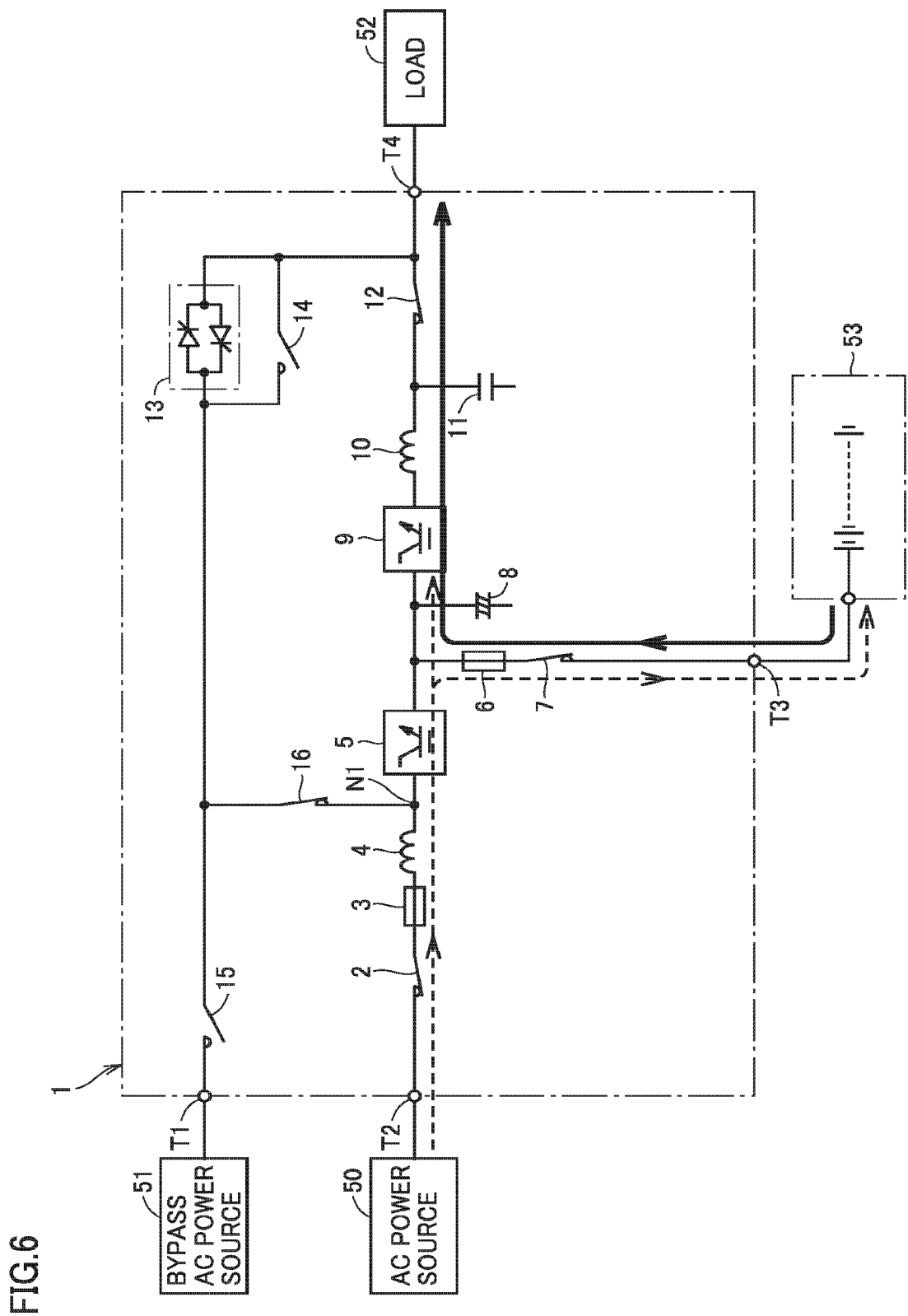
FIG. 6 illustrates a flow of power when power recovery of the AC power source is detected during the execution of the inverter power supply.

Further, the uninterruptible power source according to the first embodiment can automatically return from the inverter power supply to the power supply in the eco-mode when the supply of the three-phase AC power from AC power source 50 is resumed, i.e., when the supply of power is restarted during the execution of the inverter power supply. FIG. 6 illustrates a flow of power when the power recovery of AC power source 50 is detected during the execution of the inverter power supply. With reference to FIG. 6, during the execution of the inverter power supply, switching controller 17 (FIG. 4) detects the power recovery of AC power source 50 based on the output signal of voltage detection circuit 20 (FIG. 4). For example, switching controller 17 detects the power recovery of AC power source 50 when the effective value of the three-phase AC voltage detected by voltage detection circuit 20 becomes equal to or more than the predetermined threshold value.

When the power recovery of AC power source 50 is detected, switching controller 17 generates a starting command for starting converter 5. Switching controller 17 outputs the generated starting command to converter control circuit 30 (FIG. 4). When converter 5 is started in response to the starting command, converter control circuit 30 generates a gate signal for controlling rectification in converter 5, and outputs it to converter 5. Accordingly, as indicated by a dotted line arrow in FIG. 6, converter 5 converts (i) the three-phase AC power supplied from AC power source 50 after the power recovery into (ii) DC power. The DC power generated by converter 5 is supplied to inverter 9 and battery 53.

Based on the output signal of voltage detection circuit 20, sinusoidal wave generation circuit 38 (FIG. 4) generates a sinusoidal wave signal φ38 having commercial frequency and predetermined amplitude, in synchronization with the three-phase AC voltage supplied from AC power source 50 after the power recovery. Sinusoidal wave generation circuit 38 provides generated sinusoidal wave signal φ38 to inverter control circuit 34 (FIG. 4).

Inverter control circuit 34 controls the inversion in inverter 9 based on (i) the output signals of current transformer 36 and voltage detection circuit 35 and (ii) sinusoidal wave signal φ38 from sinusoidal wave generation circuit 38. On this occasion, inverter control circuit 34 controls inverter 9 to synchronize (i) the three-phase AC voltage detected by voltage detection circuit 35 to (ii) the three-phase AC voltage supplied from AC power source 50 after the power recovery.

Here, if the phase of the three-phase AC voltage having been supplied from AC power source 50 before the power failure is deviated from the phase of the three-phase AC voltage supplied from AC power source 50 after the power recovery, the three-phase AC voltage output from inverter 9 after the power recovery may be varied by controlling inverter 9 to synchronize (i) the three-phase AC voltage detected by voltage detection circuit 35 as described above to (ii) the three-phase AC voltage supplied from AC power source 50. In such a case, the three-phase AC voltage supplied to load 52 becomes unstable, thus presumably affecting the operation of load 52. To address this, after the power recovery of AC power source 50, inverter control circuit 34 gradually synchronizes the three-phase AC voltage output from inverter 9 to the three-phase AC voltage supplied from AC power source 50. Specifically, inverter control circuit 34 restricts an amount of change of the voltage command value between control periods to a predetermined upper limit value or less. This upper limit value is fitted through an experiment or the like so as not to affect the operation of load 52, for example.

Inverter control circuit 34 detects whether or not the three-phase AC voltage detected by voltage detection circuit 35 is in synchronization with the three-phase AC voltage supplied from AC power source 50, and provides switching controller 17 with a synchronization detection signal φ34 indicating the detected result. When the three-phase AC voltage detected by voltage detection circuit 35 is in synchronization with the three-phase AC voltage supplied from AC power source 50, synchronization detection signal φ34 is set at the H level, which is an activation level. On the other hand, when the three-phase AC voltage detected by voltage detection circuit 35 is not in synchronization with the three-phase AC voltage from AC power source 50, synchronization detection signal φ34 is set at the L level, which is a deactivation level.

When synchronization detection signal φ34 is activated at the H level, switching controller 17 sets control signal φD at the H level in order to turn on thyristor switch 13. Next, switching controller 17 sets control signal φC at the H level in order to turn on contactor 14. After passage of a predetermined response time from the setting of control signal φC at the H level, contactor 14 actually becomes on. Then, switching controller 17 sets control signal φD at the L level in order to turn off thyristor switch 13.

Further, inverter control circuit 34 stops the output of the gate signal to the gate drive circuit provided in inverter 9, thereby stopping the operation of inverter 9. Accordingly, the three-phase AC power is supplied from AC power source 50 to load 52 via contactor 14.

In this way, when supply of power from AC power source 50 is restarted, inverter control circuit 34 controls inverter 9 to synchronize (i) the three-phase AC voltage output from inverter 9 to (ii) the three-phase AC voltage supplied from AC power source 50 after the power recovery. Further, when the three-phase AC voltage output from inverter 9 synchronizes to the three-phase AC voltage supplied from AC power source 50, switching controller 17 switches from the inverter power supply to the power supply in the eco-mode by turning on thyristor switch 13 and contactor 14. Accordingly, when returning from the inverter power supply to the power supply in the eco-mode, the three-phase AC voltage supplied to load 52 can be prevented from being varied.

After the operation mode of the uninterruptible power source is returned to the eco-mode, inverter control circuit 34 continues to generate, through the PWM control, the gate signal for turning on/off the semiconductor switching element included in inverter 9. However, inverter control circuit 34 does not output the generated gate signal to inverter 9. Accordingly, inverter 9 is not operated during the execution of the eco-mode, and is in the inversion standby state.

As described above, according to the uninterruptible power source according to the first embodiment of the present invention, occurrence of momentary voltage drop can be prevented upon switching from the power supply in the eco-mode to the inverter power supply.

Moreover, when supply of power from the AC power source is restarted after changing over to the inverter power supply, the uninterruptible power source can automatically return to the power supply in the eco-mode while preventing the momentary voltage drop. Accordingly, the operation efficiency of the uninterruptible power source can be improved while securing stability of supply of power to the load.

It should be noted that in the first embodiment, the inverter power supply corresponds to a "first operation mode", and the eco-mode corresponds to a "second operation mode". Moreover, contactor 15 corresponds to a "first switch", contactor 16 corresponds to a "second switch", and contactor 2 corresponds to a "third switch". Thyristor switch 13 and contactor 14 constitute a "bypass switch".

Figure 7:
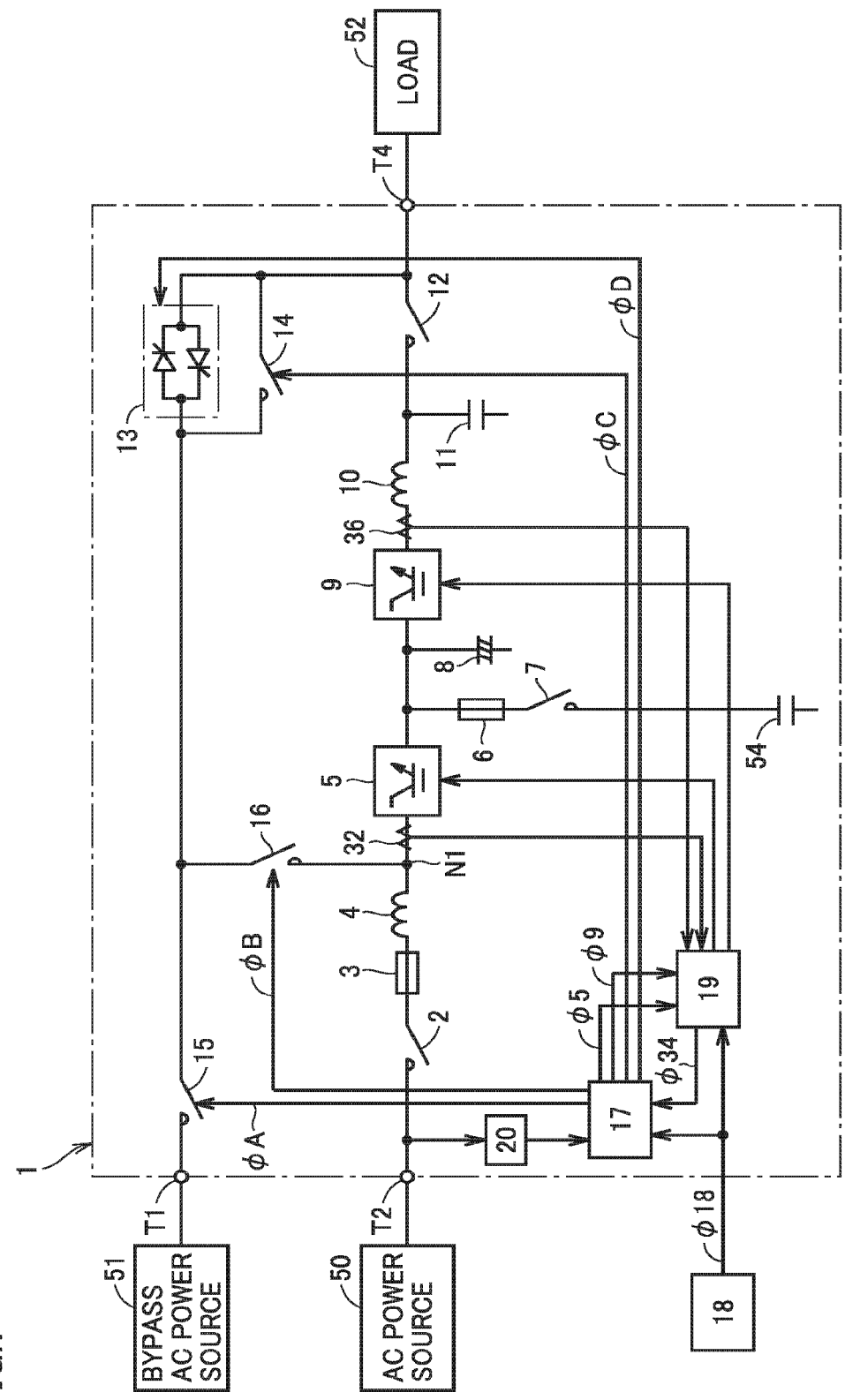
FIG. 7 is an entire configuration diagram showing another example of the configuration of the uninterruptible power source according to the first embodiment.

Moreover, in the first embodiment, it has been illustrated that the power storage device for storing DC power is battery 53; however, a power storage element other than the battery such as an electric double layer capacitor 54 may be applied, as shown in FIG. 7, for example.

[Second Embodiment]

Figure 8:
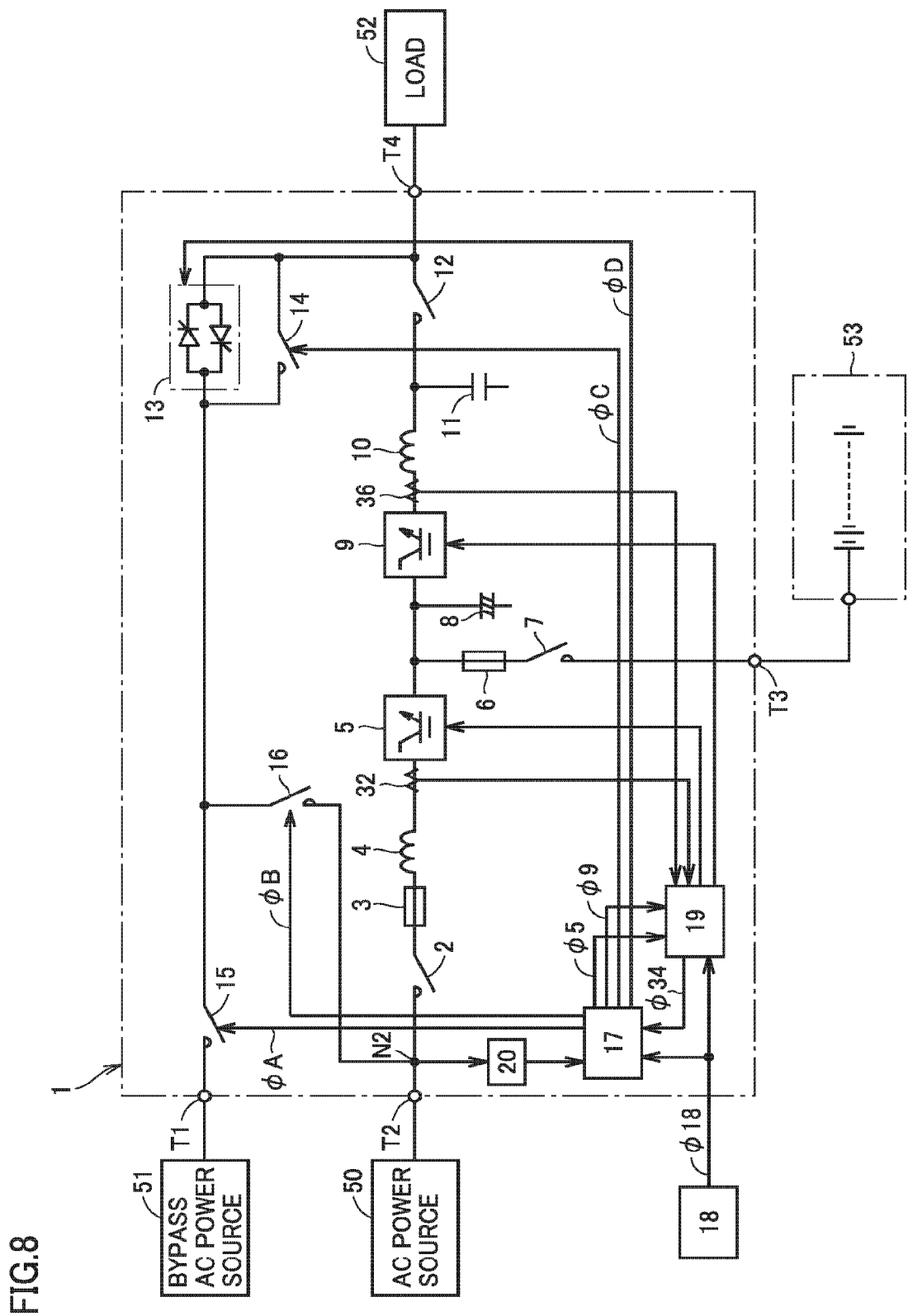
FIG. 8 is an entire configuration diagram of an uninterruptible power source according to a second embodiment of the present invention.
Figure 9:
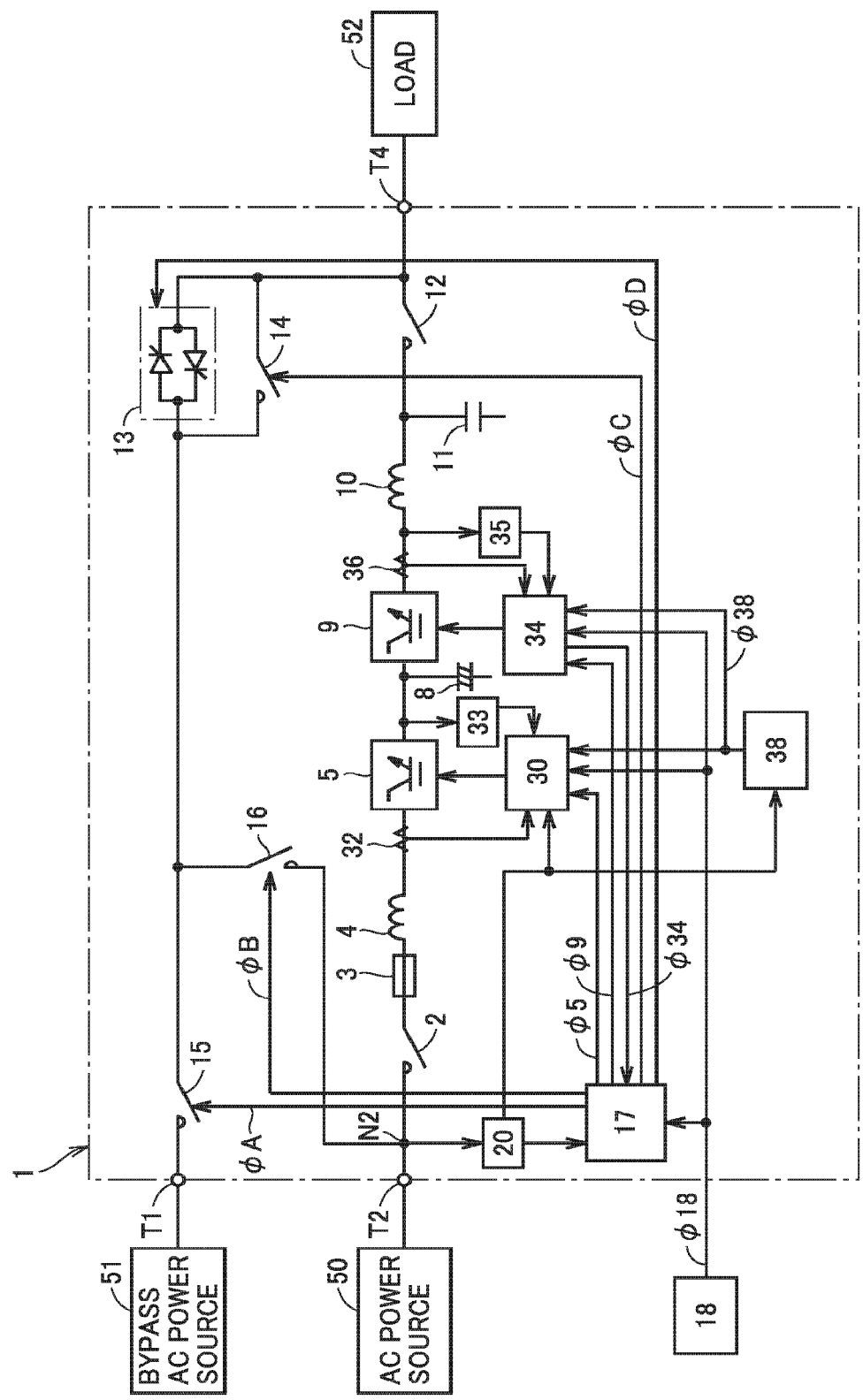
FIG. 9 is a function block diagram showing a control configuration for switching from the power supply in the eco-mode to the inverter power supply in the uninterruptible power source according to the second embodiment of the present invention.

FIG. 8 is an entire configuration diagram of an uninterruptible power source according to a second embodiment of the present invention. FIG. 9 is a function block diagram showing a control configuration for switching from the power supply in the eco-mode to the inverter power supply in the uninterruptible power source according to the second embodiment of the present invention. The uninterruptible power source according to the second embodiment is different from the uninterruptible power source according to the first embodiment shown in FIG. 1 in terms of connection of contactor 16. A configuration for performing the inverter power supply in the uninterruptible power source according to the second embodiment is the same as that of FIG. 1 and is therefore not described repeatedly in detail. Also, a control configuration for the uninterruptible power source is the same as that of FIG. 4 except a control configuration in power conversion controller 19 and is therefore not described repeatedly in detail.

With reference to FIG. 8, contactor 16 has one terminal connected to the bypass switch. The other side terminal of contactor 16 is connected to a node N2 located between input terminal T2 and contactor 2.

In the uninterruptible power source according to the second embodiment, when eco-mode setting signal φ18 is received from eco-mode setting unit 18, switching controller 17 sets control signals φB, φC, φD at the H level in order to turn on contactors 16, 14 and thyristor switch 13. Accordingly, the three-phase AC power supplied from AC power source 50 is supplied to load 52 via node N2, contactor 16, thyristor switch 13 and contactor 14.

According to the second embodiment, during the execution of the eco-mode, the three-phase AC power is supplied to load 52 without passing through reactor 4. Accordingly, as compared with the power supply in the eco-mode in the first embodiment, occurrence of power loss in reactor 4 is suppressed, thereby further improving the operation efficiency of the uninterruptible power source. It should be noted that also during the execution of the eco-mode, converter 5 is operated as required, whereby DC power can be stored in battery 53.

During the execution of the eco-mode, switching controller 17 detects power failure of AC power source 50 based on the output signal of voltage detection circuit 20. When power failure of AC power source 50 is detected, switching controller 17 turns off contactor 14 in the same manner as described in the first embodiment, thereby switching from the power supply in the eco-mode to the inverter power supply.

Specifically, with reference to FIG. 9, when the power failure of AC power source 50 is detected, switching controller 17 provides starting command φ9 to inverter control circuit 34 and provides inversion command φ5 to converter control circuit 30. When starting command φ9 is received, inverter control circuit 34 outputs, to inverter 9, the gate signal generated through the PWM control during the execution of the eco-mode in the same manner as described in the first embodiment. Inverter 9 outputs a three-phase AC voltage having commercial frequency and predetermined amplitude, in synchronization with the three-phase AC voltage having been supplied from AC power source 50 before the occurrence of the power failure. The predetermined amplitude is set such that the effective value of the three-phase AC voltage becomes 90% of the rated voltage of AC power source 50.

When inversion command φ5 is received, converter control circuit 30 controls the inversion in converter 5 based on (i) the output signals of current transformer 32 and voltage detection circuit 20 and (ii) sinusoidal wave signal φ38 from sinusoidal wave generation circuit 38. Specifically, PWM control is performed onto converter 5 to eliminate a deviation between the output signal of voltage detection circuit 20 and sinusoidal wave signal φ38. Converter control circuit 30 controls converter 5 to synchronize (i) the three-phase AC voltage detected by voltage detection circuit 20 to (ii) the three-phase AC voltage having been supplied from AC power source 50 before the occurrence of the power failure. Accordingly, node N2 is provided with the three-phase AC voltage that has commercial frequency and predetermined amplitude and that is in synchronization with the three-phase AC voltage having been supplied from AC power source 50 before the occurrence of the power failure. The three-phase AC voltage supplied to node N2 is led to contactor 14 via contactor 16.

Also in the second embodiment, as with the first embodiment, the voltage provided to the primary side of contactor 14 becomes equal to the voltage provided to the secondary side of contactor 14. Accordingly, contactor 14 becomes off immediately after switching controller 17 sets control signal φC at the L level. Accordingly, when switching from the power supply in the eco-mode to the inverter power supply, the output voltage of output terminal T4 can be prevented from being stopped momentarily.

Here, in the second embodiment, the one terminal of contactor 16 is connected to node N2 between input terminal T2 and contactor 2. Therefore, a voltage supplied to node N2 as a result of the inversion in converter 5 is determined by a ratio of (i) an impedance representing an electric distance from node N2 to an accident point located upstream of node N2 to (ii) an impedance from node N2 to the AC terminal of converter 5. For example, when it is assumed that the voltage of the AC terminal of converter 5 is represented as V1, the impedance from node N2 to the accident point is represented as Z1, and the impedance from node N2 to the AC terminal of converter 5 is represented as Z2, a voltage supplied to node N2 when the voltage of the accident point becomes 0 V is as follows: V1×Z1/(Z1+Z2). Therefore, in order to supply node N2 with the voltage corresponding to 90% of the rated voltage of AC power source 50, converter 5 needs to output a voltage obtained by multiplying 90% of the rated voltage of AC power source 50 by (Z1+Z2)/Z1. Accordingly, as ratio Z1/Z2 of impedance Z1 to impedance Z2 is smaller, the voltage to be output by converter 5 becomes higher.

Figure 10:
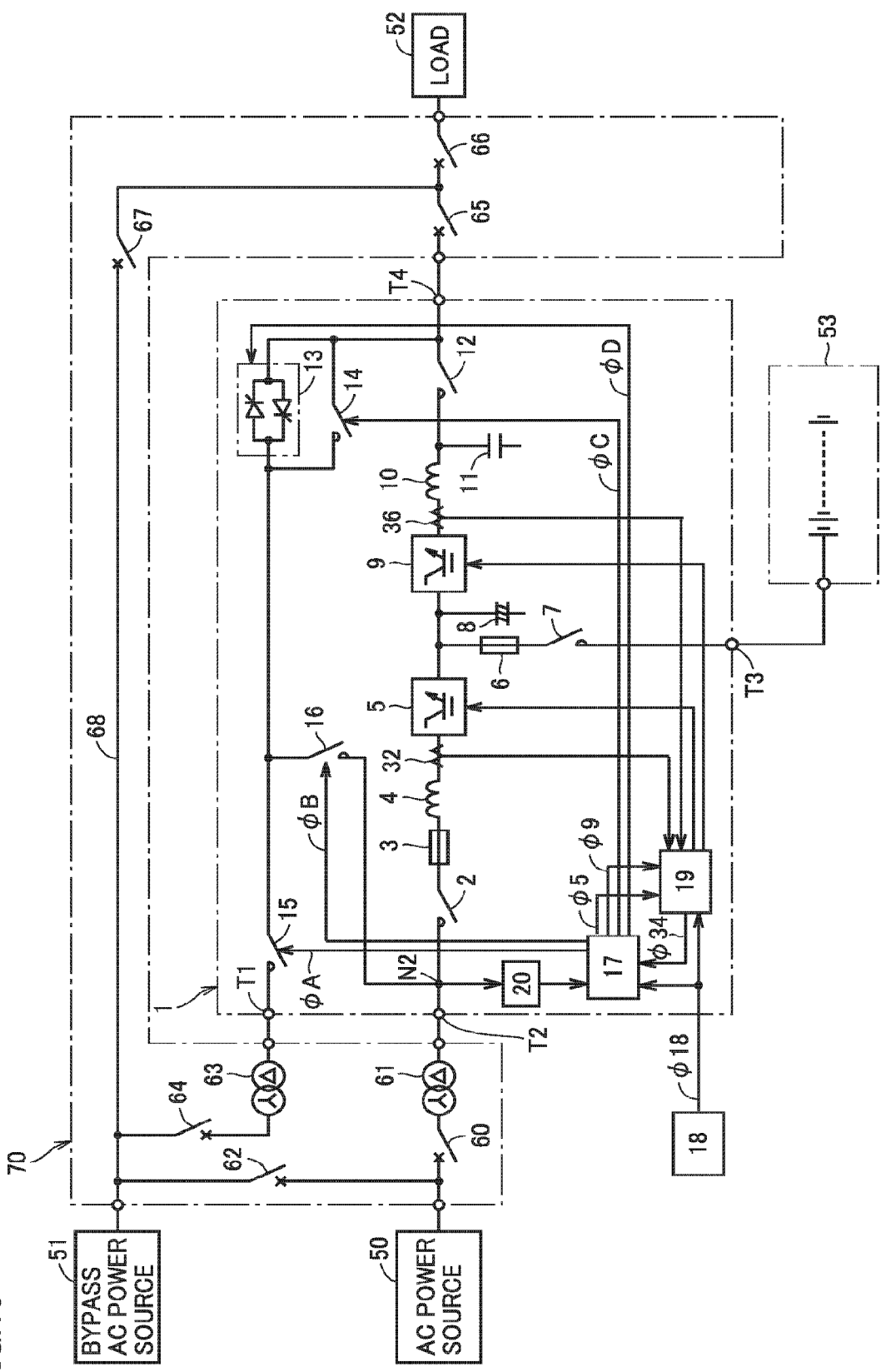
FIG. 10 is an entire configuration diagram showing another example of the configuration of the uninterruptible power source according to the second embodiment.

In order that the voltage to be output by converter 5 is not beyond the capability of converter 5, as shown in FIG. 10, it is effective to increase impedance Z1 by providing transformer 61 between AC power source 50 and input terminal T2. FIG. 10 is an entire configuration diagram showing another example of the configuration of the uninterruptible power source according to the second embodiment. With reference to FIG. 10, an input/output panel 70 is provided between the uninterruptible power source and each of AC power source 50, bypass AC power source 51, and load 52. Input/output panel 70 includes transformers 61, 63 and interrupters 60, 62, 64, 65, 66, 67.

Interrupter 60 and transformer 61 are connected in series between AC power source 50 and input terminal T2. Interrupter 60 is on in the normal state in which the AC power is normally supplied from AC power source 50, and is off in the power failure state in which supply of AC power from AC power source 50 is stopped. Transformer 61 steps down the three-phase AC voltage supplied from AC power source 50, and provides it to input terminal T2.

Interrupter 64 and transformer 63 are connected in series between bypass AC power source 51 and bypass terminal T1. Interrupter 64 is on in the normal state in which AC power is normally supplied from bypass AC power source 51, and is off in the power failure state in which supply of AC power from bypass AC power source 51 is stopped. Transformer 63 steps down the three-phase AC voltage supplied from bypass AC power source 51, and provides it to bypass terminal T1.

Interrupter 65 and interrupter 66 are connected in series between output terminal T4 and load 52. Interrupters 65, 66 are on in the normal state, and are off during maintenance of the uninterruptible power source, for example. A power line 68 is provided between (i) the connection point of interrupter 65 and interrupter 66 and (ii) bypass AC power source 51. Interrupter 67 is connected to power line 68. Interrupter 67 is off in the normal state of the uninterruptible power source, and is on during breakdown of the uninterruptible power source.

With such a configuration, impedances of transformer 61, interrupter 60, wires, and the like are added to impedance Z1 from node N2 to the accident point, thereby increasing impedance Z1. Accordingly, ratio Z1/Z2 of impedance Z1 to impedance Z2 is increased, thereby lowering the voltage to be output by converter 5. Accordingly, converter 5 can output a voltage to node N2 within the limit of the capability of converter 5.

[Third Embodiment]

In the uninterruptible power source according to each of the first and second embodiments described above, it has been illustrated that the three-phase AC power is supplied from AC power source 50 to load 52 in the eco-mode; however, the three-phase AC power may be supplied from bypass AC power source 51. In the third embodiment of the present invention, the following describes a configuration in which the three-phase AC power from bypass AC power source 51 is supplied in the eco-mode.

Figure 11:
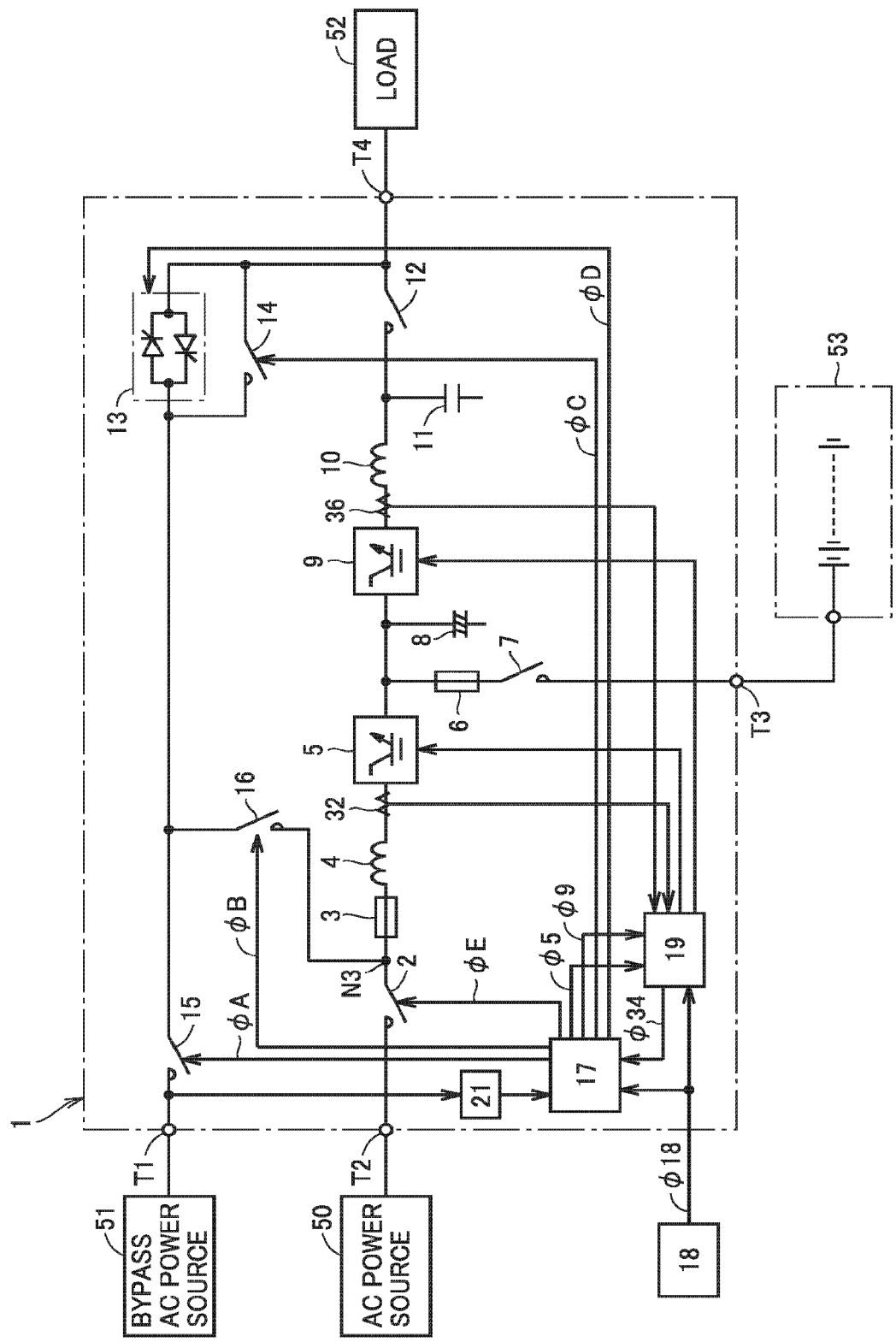
FIG. 11 is an entire configuration diagram of an uninterruptible power source according to a third embodiment of the present invention.

FIG. 11 is an entire configuration diagram of an uninterruptible power source according to the third embodiment of the present invention. The uninterruptible power source according to the third embodiment is obtained by providing a voltage detection circuit 21 in the uninterruptible power source according to the first embodiment shown in FIG. 1, instead of voltage detection circuit 20. A configuration for performing the inverter power supply in the uninterruptible power source according to the third embodiment is the same as that of FIG. 1 and is therefore not described repeatedly in detail.

With reference to FIG. 11, contactor 2 is connected to an electric conduction path between input terminal T2 and converter 5. Contactor 2 is on when control signal φE from switching controller 17 is at the H level, and is off when control signal φE is at the L level.

Contactor 16 is connected between (i) a node N3 located between contactor 2 and fuse 3 and (ii) the one terminal of the bypass switch. Contactor 16 becomes on when control signal φB from switching controller 17 is at the H level, and becomes off when control signal φB is at the L level.

When eco-mode setting signal φ18 is received from eco-mode setting unit 18, switching controller 17 switches the operation mode from (i) the normal mode in which the three-phase AC power is supplied from AC power source 50 to load 52 via converter 5 and inverter 9 to (ii) the eco-mode in which the three-phase AC power is supplied from bypass AC power source 51 to load 52 via thyristor switch 13 and contactor 14.

Specifically, when eco-mode setting signal φ18 is received, switching controller 17 controls contactors 2, 14, 15, 16 and thyristor switch 13 to form a power path between bypass AC power source 51 and load 52. When eco-mode setting signal φ18 is received, switching controller 17 sets control signal φA at the H level in order to turn on contactor 15. After passage of a predetermined response time from the setting of control signal φA at the H level, contactor 15 actually becomes on.

Next, switching controller 17 sets control signal φD at the H level in order to turn on thyristor switch 13, and sets control signal φE at the L level in order to turn off contactor 2. When control signal φD is set at the H level, thyristor switch 13 is turned on immediately. On the other hand, after passage of a predetermined response time from the setting of control signal φE at the L level, contactor 2 becomes off. When contactor 2 becomes off, AC power source 50 is disconnected from the uninterruptible power source, thereby supplying the three-phase AC power from bypass AC power source 51 to load 52 via thyristor switch 13.

Next, switching controller 17 sets control signals φB, φC at the H level in order to turn on contactors 16, 14. After passage of a predetermined response time from the setting of control signals φB, φC at the H level, contactors 16, 14 actually become on. Then, switching controller 17 sets control signal φD at the L level in order to turn off thyristor switch 13. Accordingly, the three-phase AC power is supplied from bypass AC power source 51 to load 52 via contactor 14. Moreover, node N3 is connected to one terminal of contactor 14 via contactor 16.

When the eco-mode setting signal φ18 is received from eco-mode setting unit 18, power conversion controller 19 operates converter 5 to store DC power in battery 53. Specifically, power conversion controller 19 controls rectification in converter 5 in accordance with the remaining state of charge in battery 53 in order to bring battery 53 into a predetermined fully charged state.

Further, power conversion controller 19 generates a gate signal for turning on/off a semiconductor switching element included in inverter 9 during the execution of the eco-mode. Power conversion controller 19 generates a gate signal such that three-phase AC voltage synchronized to the three-phase AC voltage supplied from bypass AC power source 51 is output from inverter 9. However, power conversion controller 19 does not output the generated gate signal to the gate drive circuit provided in inverter 9 during the execution of the eco-mode. Hence, inverter 9 is not operated during the execution of the eco-mode, and is therefore in a standby state (gate signal input waiting state) until a gate signal is received from power conversion controller 19.

Voltage detection circuit 21 detects an instantaneous value of the three-phase AC voltage supplied from bypass AC power source 51, and provides switching controller 17 with a signal indicating the detected value. During the execution of the eco-mode, switching controller 17 detects power failure of bypass AC power source 51 based on the output signal of voltage detection circuit 21. For example, switching controller 17 detects power failure of bypass AC power source 51 when the effective value of the three-phase AC voltage detected by voltage detection circuit 21 falls below the predetermined threshold value. When power failure of bypass AC power source 51 is detected, switching controller 17 generates a starting command φ9 for starting inverter 9 that is in the standby state. Switching controller 17 outputs generated starting command φ9 to power conversion controller 19. When inverter 9 is started in response to this starting command φ9, the uninterruptible power source is switched from the power supply in the eco-mode to the inverter power supply.

Figure 12:
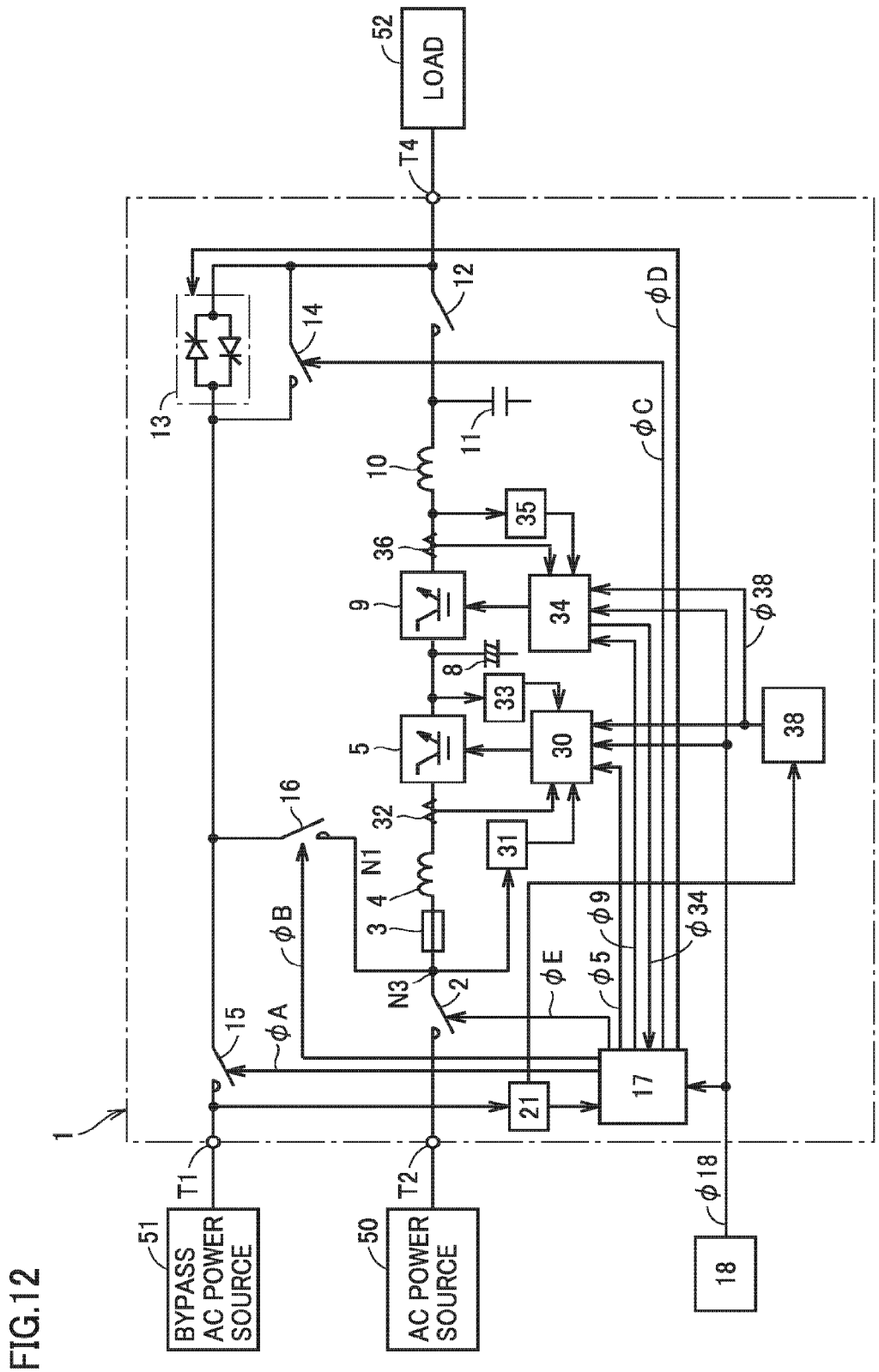
FIG. 12 is a function block diagram showing a control configuration for switching from the power supply in the eco-mode to the inverter power supply in the uninterruptible power source according to the third embodiment of the present invention.

FIG. 12 is a function block diagram showing a control configuration for switching from the power supply in the eco-mode to the inverter power supply in the uninterruptible power source according to the third embodiment of the present invention. With reference to FIG. 12, power conversion controller 19 includes a converter control circuit 30, an inverter control circuit 34, voltage detection circuits 31, 33, 35, and a sinusoidal wave generation circuit 38.

Voltage detection circuit 31 detects an instantaneous value of the three-phase AC voltage provided to node N3, and provides the detected value to converter control circuit 30. Voltage detection circuit 33 detects a voltage between the terminals of electrolytic capacitor 8, and provides the detected value to converter control circuit 30. When eco-mode setting signal φ18 is received from eco-mode setting unit 18, converter control circuit 30 controls, based on the output signals of current transformer 32 and voltage detection circuit 33, the rectification in converter 5 to supply predetermined DC voltage to battery 53.

Voltage detection circuit 35 detects the instantaneous value of the three-phase AC voltage output from inverter 9, and provides the detected value to inverter control circuit 34. Based on the output signal of voltage detection circuit 21, sinusoidal wave generation circuit 38 generates a sinusoidal wave signal φ38 having commercial frequency and predetermined amplitude, in synchronization with the three-phase AC voltage supplied from bypass AC power source 51. This predetermined amplitude is set such that the effective value of sinusoidal wave signal φ38 becomes 90% of the rated voltage of AC power source 50, for example. Sinusoidal wave generation circuit 38 provides generated sinusoidal wave signal φ38 to inverter control circuit 34.

When eco-mode setting signal φ18 is received from eco-mode setting unit 18, inverter control circuit 34 controls the inversion in inverter 9 based on (i) the output signals of current transformer 36 and voltage detection circuit 35 and (ii) sinusoidal wave signal φ38 from sinusoidal wave generation circuit 38. On this occasion, inverter control circuit 34 controls inverter 9 to synchronize (i) the three-phase AC voltage detected by voltage detection circuit 35 to (ii) the three-phase AC voltage supplied from bypass AC power source 51. However, inverter control circuit 34 does not output the gate signal, which has been generated through the PWM control, to the gate drive circuit provided in inverter 9 during the execution of the eco-mode. Accordingly, inverter 9 is not operated during the execution of the eco-mode, and is in the standby state. In this way, during the execution of the eco-mode, converter 5 converts (i) the three-phase AC power from bypass AC power source 51 into (ii) DC power and supplies it to battery 53. On the other hand, inverter 9 is in the inversion standby state.

During the execution of the eco-mode, based on the output signal of voltage detection circuit 21, switching controller 17 determines whether or not power failure of bypass AC power source 51 has occurred. When the power failure of bypass AC power source 51 is detected, switching controller 17 provides inversion command φ5 to converter control circuit 30. Further, switching controller 17 provides starting command φ9 to inverter control circuit 34.

When inversion command φ5 is received from switching controller 17, converter control circuit 30 controls the inversion in converter 5 based on (i) the output signals of current transformer 32 and voltage detection circuit 31 and (ii) sinusoidal wave signal φ38 from sinusoidal wave generation circuit 38. Specifically, after detecting the power failure of bypass AC power source 51, sinusoidal wave generation circuit 38 generates a sinusoidal wave signal having commercial frequency and predetermined amplitude, in synchronization with the three-phase AC voltage having been supplied from bypass AC power source 51 before the occurrence of the power failure. The predetermined amplitude is set such that the effective value of the sinusoidal wave signal becomes 90% of the rated voltage of AC power source 50, for example. Converter control circuit 30 performs PWM control onto converter 5 in order to eliminate a deviation between the output signal of voltage detection circuit 31 and sinusoidal wave signal φ38 generated in sinusoidal wave generation circuit 38. On this occasion, converter control circuit 30 controls converter 5 to synchronize (i) the three-phase AC voltage detected by voltage detection circuit 31 to (ii) the three-phase AC voltage having been supplied from bypass AC power source 51 before the occurrence of the power failure.

Converter 5 converts (i) the DC power stored in battery 53 into (ii) three-phase AC power of commercial frequency. Node N3 is provided with the three-phase AC voltage having commercial frequency and predetermined amplitude, in synchronization with the three-phase AC voltage supplied from bypass AC power source 51 before the occurrence of the power failure. The three-phase AC power supplied to node N3 is led to contactor 14 via contactor 16.

During the execution of the eco-mode, when starting command φ9 is received from switching controller 17, inverter control circuit 34 outputs the gate signal generated through the PWM control to inverter 9. Accordingly, inverter 9 converts (i) the DC power stored in battery 53 into (ii) three-phase AC power of commercial frequency. Inverter 9 outputs the three-phase AC voltage having commercial frequency and predetermined amplitude, in synchronization with the three-phase AC voltage supplied from bypass AC power source 51 before the occurrence of the power failure.

The three-phase AC voltage output from inverter 9 is supplied to output terminal T4.

Switching controller 17 sets control signal ϕC at the L level to turn off contactor 14. The primary side of contactor 14 is provided, via node N1, with the three-phase AC voltage synchronized to the three-phase AC voltage having been supplied from bypass AC power source 51 before the occurrence of the power failure. On the other hand, the secondary side of contactor 14 is provided, via output terminal T4, with the three-phase AC voltage synchronized to the three-phase AC voltage having been supplied from bypass AC power source 51 before the occurrence of the power failure. Contactor 14 is brought into the state in which the electric conduction is interrupted when the voltage of the primary side becomes equal to the voltage of the secondary side. Accordingly, contactor 14 is turned off immediately after the setting of control signal ϕC at the L level, before the timing which comes every half cycle of the AC and at which the current value becomes zero. Accordingly, until contactor 14 is turned off, the voltage of output terminal T4 can be maintained at the three-phase AC voltage output from inverter 9. Accordingly, when switching from the power supply in the eco-mode to the inverter power supply, the output voltage of output terminal T4 can be prevented from being dropped momentarily. After contactor 14 is turned off, converter control circuit 30 stops the operation of converter 5 at a timing at which the AC output from converter 5 reaches the zero point.

Further, the uninterruptible power source according to the third embodiment can automatically return from the inverter power supply to the power supply in the eco-mode when the supply of the three-phase AC power from bypass AC power source 51 is resumed, i.e., when the supply of power is restarted after changing over to the inverter power supply.

Specifically, during the execution of the inverter power supply, switching controller 17 detects the power recovery of bypass AC power source 51 based on the output signal of voltage detection circuit 21. For example, switching controller 17 detects the power recovery of bypass AC power source 51 when the effective value of the three-phase AC voltage detected by voltage detection circuit 21 becomes equal to or more than the predetermined threshold value.

When the power recovery of bypass AC power source 51 is detected, switching controller 17 generates a starting command for starting converter 5. Switching controller 17 outputs the generated starting command to converter control circuit 30. When converter 5 is started in response to the starting command, converter control circuit 30 generates a gate signal for controlling the rectification in converter 5, and outputs it to converter 5. Accordingly, converter 5 converts (i) the three-phase AC power supplied from bypass AC power source 51 after the power recovery into (ii) DC power.

Based on the output signal of voltage detection circuit 21, sinusoidal wave generation circuit 38 generates a sinusoidal wave signal ϕ38 having commercial frequency and predetermined amplitude, in synchronization with the three-phase AC voltage supplied from bypass AC power source 51 after the power recovery. Sinusoidal wave generation circuit 38 provides generated sinusoidal wave signal ϕ38 to inverter control circuit 34.

Inverter control circuit 34 controls the inversion in inverter 9 based on (i) the output signals of current transformer 36 and voltage detection circuit 35 and (ii) sinusoidal wave signal ϕ38 from sinusoidal wave generation circuit 38. Specifically, inverter control circuit 34 performs PWM control onto inverter 9 in order to eliminate a deviation between the output signal of voltage detection circuit 35 and sinusoidal wave signal ϕ38 generated in sinusoidal wave generation circuit 38. On this occasion, inverter control circuit 34 controls inverter 9 to synchronize (i) the three-phase AC voltage detected by voltage detection circuit 35 to (ii) the three-phase AC voltage supplied from bypass AC power source 51. It should be noted that after the power recovery, inverter control circuit 34 gradually synchronizes the three-phase AC voltage output from inverter 9 to the three-phase AC voltage supplied from bypass AC power source 51. Specifically, inverter control circuit 34 restricts an amount of change of the voltage command value between control periods to a predetermined upper limit value or less. This upper limit value is fitted through an experiment or the like so as not to affect the operation of load 52, for example.

Inverter control circuit 34 detects whether or not the three-phase AC voltage detected by voltage detection circuit 35 is in synchronization with the three-phase AC voltage supplied from bypass AC power source 51, and provides switching controller 17 with a synchronization detection signal ϕ34 indicating the detected result. When the three-phase AC voltage detected by voltage detection circuit 35 is in synchronization with the three-phase AC voltage supplied from bypass AC power source 51, synchronization detection signal ϕ34 is set at the H level, which is an activation level. On the other hand, when the three-phase AC voltage detected by voltage detection circuit 35 is not in synchronization with the three-phase AC voltage from bypass AC power source 51, synchronization detection signal ϕ34 is set at the L level, which is a deactivation level.

When synchronization detection signal ϕ34 is activated at the H level, switching controller 17 sets control signal ϕD at the H level in order to turn on thyristor switch 13. Next, switching controller 17 sets control signal ϕC at the H level in order to turn on contactor 14. After passage of a predetermined response time from the setting of control signal ϕC at the H level, contactor 14 actually becomes on. Then, switching controller 17 sets control signal ϕD at the L level in order to turn off thyristor switch 13.

Further, inverter control circuit 34 stops the output of the gate signal to the gate drive circuit provided in inverter 9, thereby stopping the operation of inverter 9. Accordingly, the three-phase AC power is supplied from bypass AC power source 51 to load 52 via contactor 14.

In this way, when supply of power from bypass AC power source 51 is restarted, inverter control circuit 34 controls inverter 9 to synchronize (i) the three-phase AC voltage output from inverter 9 to (ii) the three-phase AC voltage supplied from bypass AC power source 51 after the power recovery. Further, when the three-phase AC voltage output from inverter 9 is in synchronization with the three-phase AC voltage supplied from bypass AC power source 51, switching controller 17 switches from the inverter power supply to the power supply in the eco-m ode by turning on thyristor switch 13 and contactor 14. Accordingly, when returning from the inverter power supply to the power supply in the eco-mode, the three-phase AC voltage supplied to load 52 can be prevented from being varied.

After the operation mode of the uninterruptible power source is returned to the eco-mode, inverter control circuit 34 continues to generate, through the PWM control, the gate signal for turning on/off the semiconductor switching element included in inverter 9. However, inverter control circuit 34 does not output the generated gate signal to inverter 9. Accordingly, inverter 9 is not operated during the execution of the eco-mode, and is in the standby state.

Here, in the third embodiment, the voltage supplied to node N3 as a result of inversion in converter 5 is determined by a ratio of (i) an impedance from node N3 to the accident point to (ii) an impedance from node N3 to the AC terminal of converter 5. As described in the second embodiment, assuming that the impedance from node N3 to the accident point is represented by Z1 and the impedance from node N3 to the AC terminal of converter 5 is represented by Z2, the voltage to be output by converter 5 becomes higher as ratio Z1/Z2 of such impedances is smaller.

Figure 13:
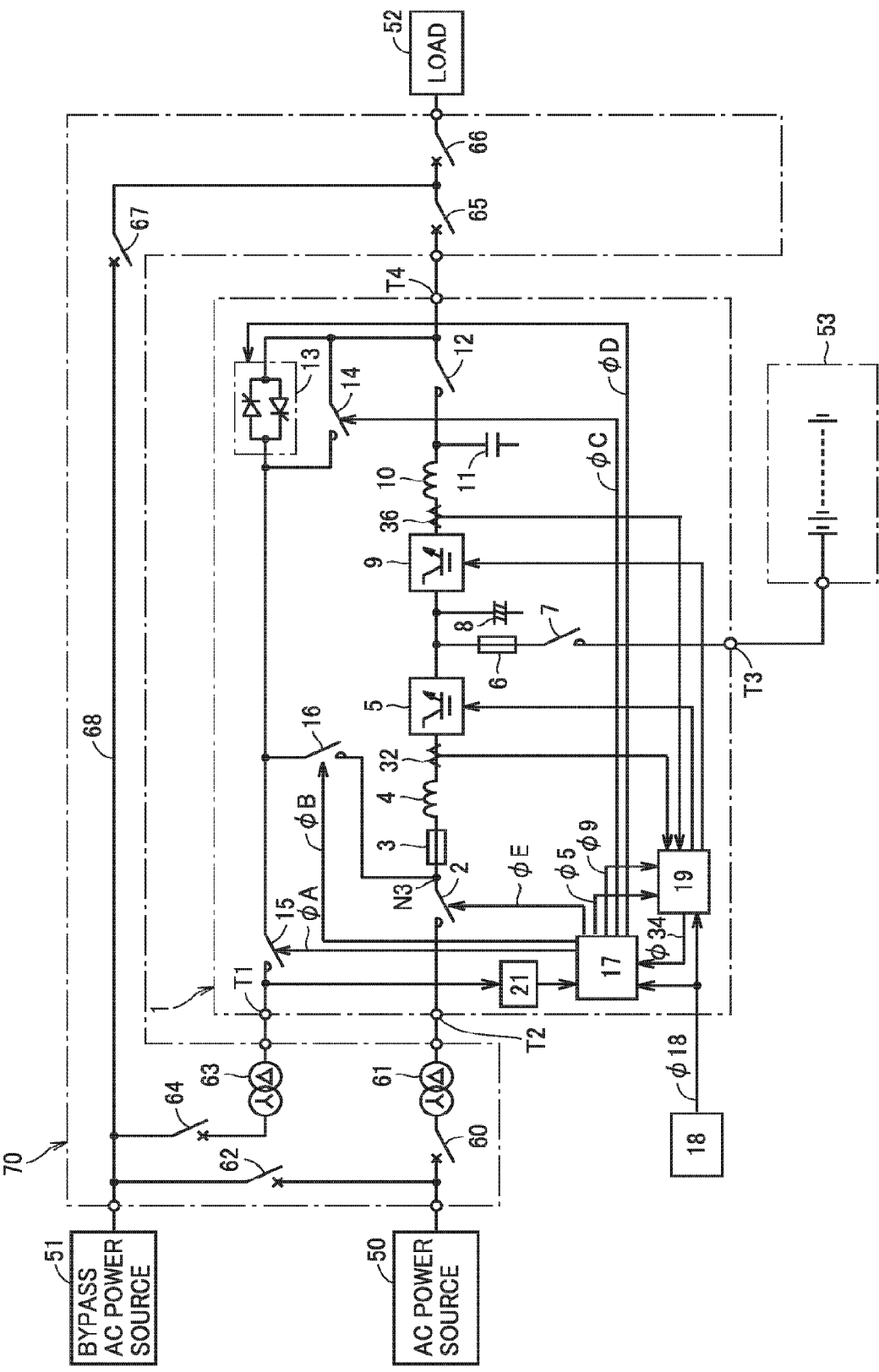
FIG. 13 is an entire configuration diagram showing another example of the configuration of the uninterruptible power source according to the third embodiment.

Therefore, also in the third embodiment, as shown in FIG. 13, impedance Z1 is increased by providing transformer 63 between bypass AC power source 51 and bypass terminal T1. FIG. 13 is an entire configuration diagram showing another example of the configuration of the uninterruptible power source according to the third embodiment. Accordingly, impedances of transformer 63, interrupter 64, wires, and the like are added to impedance Z1 from node N3 to the accident point, and impedance Z1 is therefore increased, thereby increasing ratio Z1/Z2 of impedance Z1 to impedance Z2. Accordingly, the voltage to be output by converter 5 can be decreased, whereby converter 5 can output a voltage to node N2 within the limit of the capability of converter 5.

As described above, according to the uninterruptible power source according to the third embodiment of the present invention, the voltage output to output terminal T4 can be prevented from being dropped momentarily upon switching from the power supply in the eco-mode to the inverter power supply.

Moreover, when supply of power from bypass AC power source 51 is restarted after changing over to the inverter power supply, the uninterruptible power source can automatically return to the power supply in the eco-mode while preventing the voltage output to output terminal T4 from being dropped momentarily. Accordingly, the operation efficiency of the uninterruptible power source can be improved while securing stable supply of power to load 52.

[Fourth Embodiment]

In the uninterruptible power source according to the first and second embodiments described above, it has been illustrated that the AC power from AC power source 50 is supplied to load 52 during the eco-mode. Moreover, in the uninterruptible power source according to the third embodiment, it has been illustrated that the AC power from bypass AC power source 51 is supplied to load 52 during the eco-mode. In the fourth embodiment of the present invention, the following describes a configuration in which one of AC power source 50 and bypass AC power source 51 is selected during the eco-mode and AC power is supplied from the selected AC power source to load 52.

Figure 14:
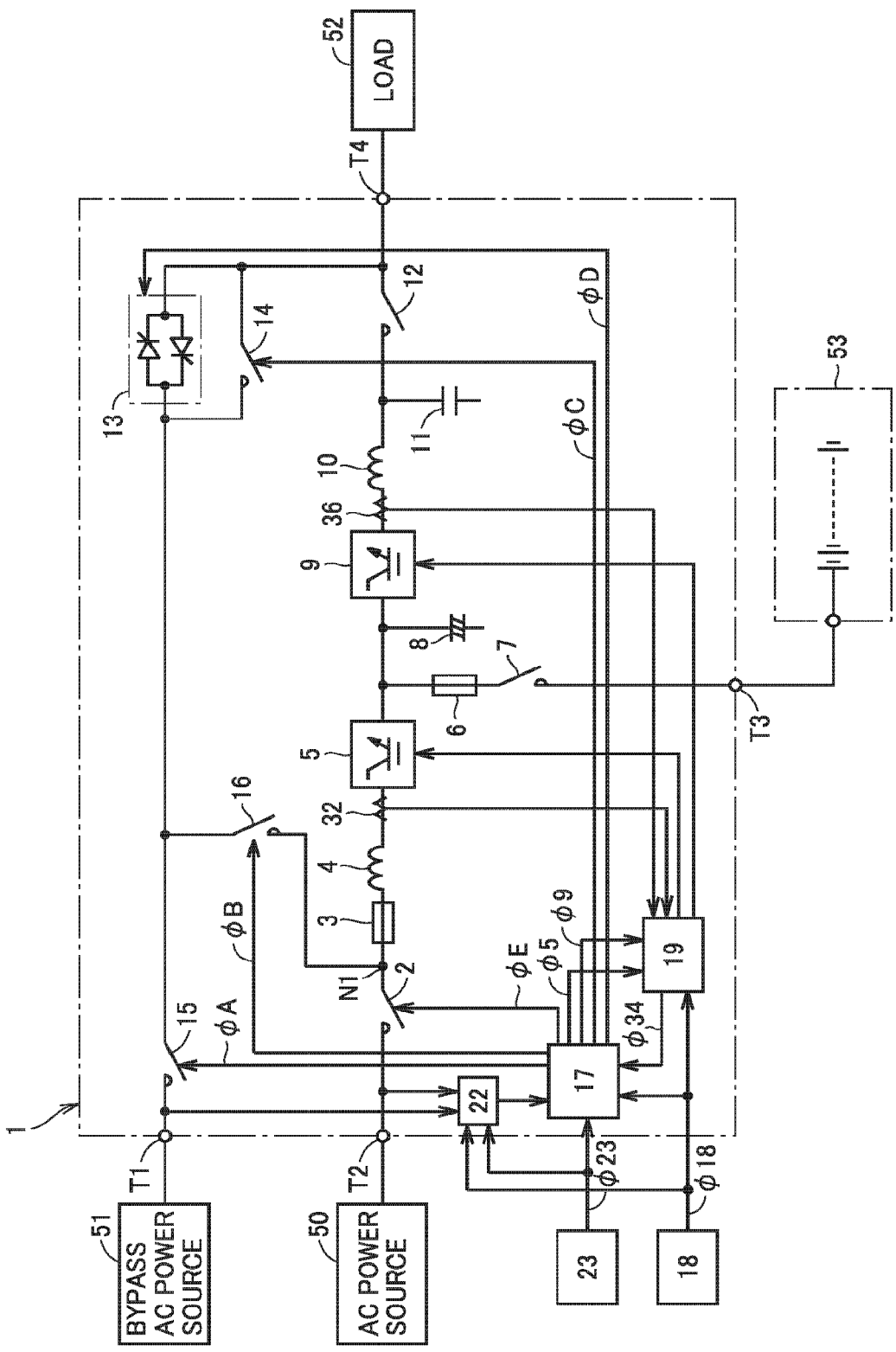
FIG. 14 is an entire configuration diagram of an uninterruptible power source according to a fourth embodiment of the present invention.

FIG. 14 is an entire configuration diagram of an uninterruptible power source according to the fourth embodiment of the present invention. The uninterruptible power source according to the fourth embodiment is obtained by providing a voltage detection circuit 22 and a power source selection unit 23 in the uninterruptible power source according to the first embodiment shown in FIG. 1, instead of voltage detection circuit 20. A configuration for performing the inverter power supply in the uninterruptible power source according to the fourth embodiment is the same as that of FIG. 1 and is therefore not described repeatedly in detail.

With reference to FIG. 14, power source selection unit 23 selects one of AC power source 50 and bypass AC power source 51 during the eco-mode, and outputs, to switching controller 17 and voltage detection circuit 22, a selection signal φ23 indicating the selected AC power source. The AC power source may be selected in the following manner: for example, a switch for receiving an operation of a user selecting an AC power source is provided in housing 1, and power source selection unit 23 provides an output corresponding to the AC power source thus selected by the operation received via the switch. When AC power source 50 is selected, selection signal φ23 is set at the H level, whereas when bypass AC power source 51 is selected, selection signal φ23 is set at the L level.

When selection signal φ23 is at the H level, that is, when AC power source 50 is selected, voltage detection circuit 22 detects an instantaneous value of the three-phase AC voltage supplied from AC power source 50, and provides switching controller 17 with a signal indicating the detected value. On the other hand, when selection signal φ23 is at the L level, that is, when bypass AC power source 51 is selected, voltage detection circuit 22 detects an instantaneous value of the three-phase AC voltage supplied from bypass AC power source 51, and provides switching controller 17 with a signal indicating the detected value.

Switching controller 17 receives an eco-mode setting signal φ18 from eco-mode setting unit 18, and receives a selection signal φ23 from power source selection unit 23. When eco-mode setting signal φ18 is received, switching controller 17 switches the operation mode to the eco-mode from the normal mode in which the three-phase AC power is supplied from AC power source 50 to load 52 via converter 5 and inverter 9.

On this occasion, when selection signal φ23 is at the H level, switching controller 17 controls contactors 14, 15, 16 and thyristor switch 13 to form a power path between AC power source 50 and load 52. Next, switching controller 17 sets control signals φB, φC, φD at the H level in order to turn on contactors 16, 14 and thyristor switch 13, and sets control signal φA at the L level in order to turn off contactor 15.

On the other hand, when selection signal φ23 is at the L level, switching controller 17 controls contactors 2, 14, 15, 16 and thyristor switch 13 to form a power path between bypass AC power source 51 and load 52. Next, switching controller 17 sets control signals φA, φB, φC, φD at the H level in order to turn on contactors 15, 16, 14 and thyristor switch 13, and sets control signal φE at the L level in order to turn off contactor 2.

When eco-mode setting signal φ18 is received from eco-mode setting unit 18, power conversion controller 19 operates converter 5 to store DC power in battery 53. Further, power conversion controller 19 generates a gate signal for turning on/off a semiconductor switching element included in inverter 9 during the execution of the eco-mode. When selection signal φ23 is at the H level, power conversion controller 19 generates a gate signal such that three-phase AC voltage synchronized to the three-phase AC voltage supplied from AC power source 50 is output from inverter 9. On the other hand, when selection signal φ23 is at the L level, power conversion controller 19 generates a gate signal such that three-phase AC voltage synchronized to the three-phase AC voltage supplied from bypass AC power source 51 is output from inverter 9. However, power conversion controller 19 does not output the generated gate signal to the gate drive circuit provided in inverter 9 during the execution of the eco-mode. Hence, inverter 9 is not operated during the execution of the eco-mode, and is therefore in a standby state (gate signal input waiting state) until a gate signal is received from power conversion controller 19.

When selection signal φ23 is at the H level, voltage detection circuit 22 detects an instantaneous value of the three-phase AC voltage supplied from AC power source 50, and provides switching controller 17 with a signal indicating the detected value. During the execution of the eco-mode, switching controller 17 detects power failure of AC power source 50 based on the output signal of voltage detection circuit 22. When the power failure of AC power source 50 is detected, switching controller 17 generates starting command φ9, and outputs generated starting command φ9 to power conversion controller 19.

On the other hand, when selection signal φ23 is at the L level, voltage detection circuit 22 detects an instantaneous value of the three-phase AC voltage supplied from bypass AC power source 51, and provides switching controller 17 with a signal indicating the detected value. During the execution of the eco-mode, switching controller 17 detects power failure of bypass AC power source 51 based on the output signal of voltage detection circuit 22. When power failure of bypass AC power source 51 is detected, switching controller 17 generates starting command φ9, and outputs generated starting command φ9 to power conversion controller 19. When inverter 9 is started in response to this starting command φ9, the uninterruptible power source is switched from the power supply in the eco-mode to the inverter power supply.

Figure 15:
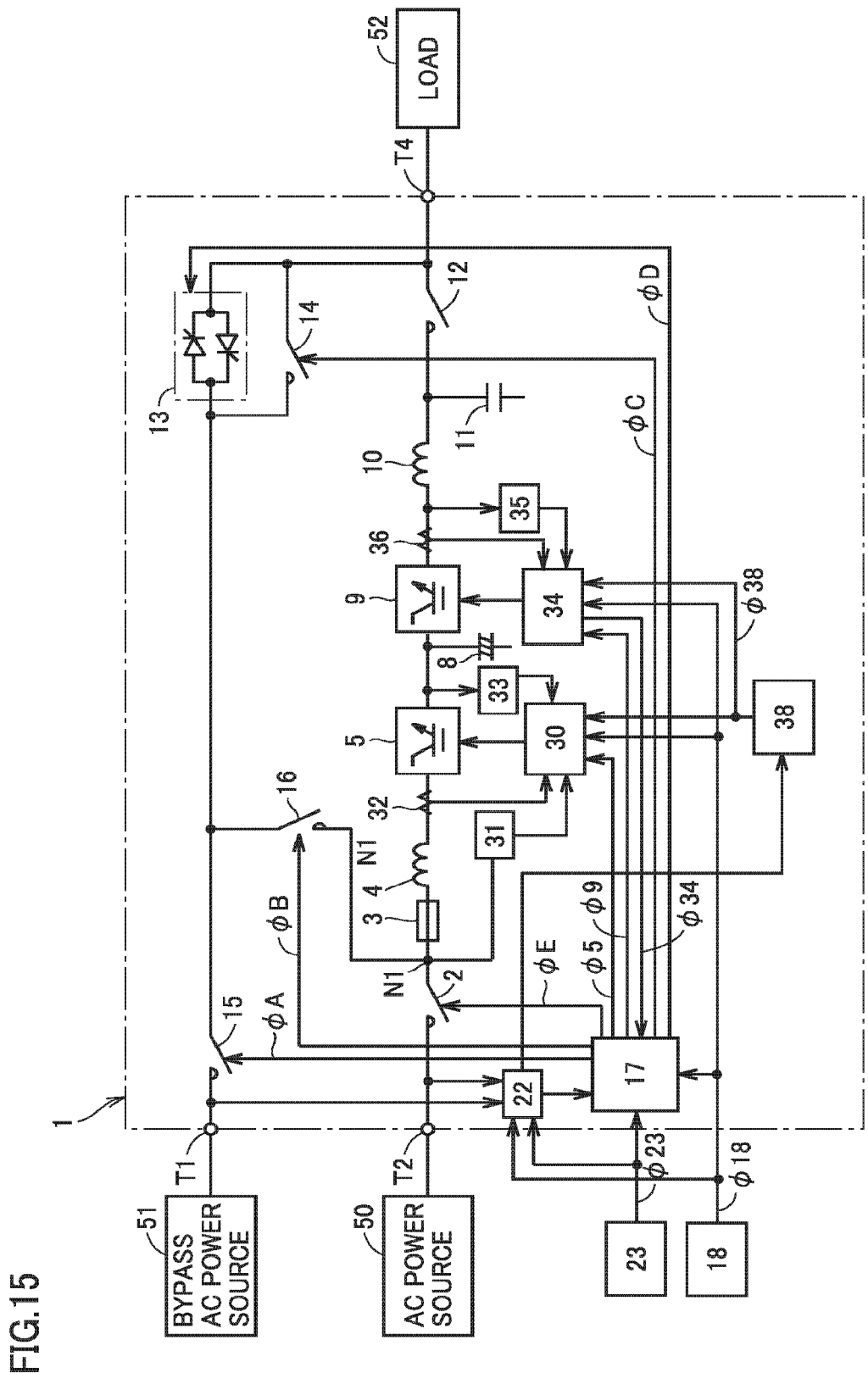
FIG. 15 is a function block diagram showing a control configuration for switching from the power supply in the eco-mode to the inverter power supply in the uninterruptible power source according to the fourth embodiment of the present invention.

FIG. 15 is a function block diagram showing a control configuration for switching from the power supply in the eco-mode to the inverter power supply in the uninterruptible power source according to the fourth embodiment of the present invention. With reference to FIG. 15, power conversion controller 19 includes a converter control circuit 30, an inverter control circuit 34, voltage detection circuits 31, 33, 35, and a sinusoidal wave generation circuit 38.

Voltage detection circuit 31 detects an instantaneous value of the three-phase AC voltage provided to node N3, and provides the detected value to converter control circuit 30. Voltage detection circuit 33 detects a voltage between the terminals of electrolytic capacitor 8, and provides the detected value to converter control circuit 30. When eco-mode setting signal φ18 is received from eco-mode setting unit 18, converter control circuit 30 controls, based on the output signals of current transformer 32 and voltage detection circuit 33, the rectification in converter 5 to supply predetermined DC voltage to battery 53.

Voltage detection circuit 35 detects the instantaneous value of the three-phase AC voltage output from inverter 9, and provides the detected value to inverter control circuit 34. When selection signal φ23 is at the H level, sinusoidal wave generation circuit 38 generates, based on the output signal of voltage detection circuit 22, a sinusoidal wave signal φ38 having commercial frequency and predetermined amplitude, in synchronization with the three-phase AC voltage supplied from AC power source 50. The predetermined amplitude is set such that the effective value of sinusoidal wave signal φ38 becomes 90% of the rated voltage of AC power source 50, for example. On the other hand, when selection signal φ23 is at the L level, sinusoidal wave generation circuit 38 generates, based on the output signal of voltage detection circuit 22, a sinusoidal wave signal φ38 having commercial frequency and predetermined amplitude, in synchronization with the three-phase AC voltage supplied from bypass AC power source 51. The predetermined amplitude is set such that the effective value of sinusoidal wave signal φ38 becomes 90% of the rated voltage of bypass AC power source 51, for example. Sinusoidal wave generation circuit 38 provides generated sinusoidal wave signal φ38 to inverter control circuit 34.

When eco-mode setting signal φ18 is received from eco-mode setting unit 18, inverter control circuit 34 controls the inversion in inverter 9 based on (i) the output signals of current transformer 36 and voltage detection circuit 35 and (ii) sinusoidal wave signal φ38 from sinusoidal wave generation circuit 38. On this occasion, when selection signal φ23 is at the H level, inverter control circuit 34 controls inverter 9 to synchronize (i) the three-phase AC voltage detected by voltage detection circuit 35 to (ii) the three-phase AC voltage supplied from AC power source 50. On the other hand, when selection signal φ23 is at the L level, inverter control circuit 34 controls inverter 9 to synchronize (i) the three-phase AC voltage detected by voltage detection circuit 35 to (ii) the three-phase AC voltage supplied from bypass AC power source 51. However, inverter control circuit 34 does not output the generated gate signal to the gate drive circuit provided in inverter 9 during the execution of the eco-mode. In this way, during the execution of the eco-mode, converter 5 converts (i) the three-phase AC power from AC power source 50 or bypass AC power source 51 into (ii) DC power and supplies it to battery 53. On the other hand, the operation of inverter 9 is stopped.

During the execution of the eco-mode, when selection signal φ23 is at the H level, switching controller 17 determines, based on the output signal of voltage detection circuit 22, whether or not power failure of AC power source 50 has occurred. On the other hand, when selection signal φ23 is at the L level, switching controller 17 determines, based on the output signal of voltage detection circuit 22, whether or not power failure of bypass AC power source 51 has occurred. When power failure of AC power source 50 or bypass AC power source 51 is detected, switching controller 17 provides inversion command φ5 to converter control circuit 30. Further, switching controller 17 provides starting command φ9 to inverter control circuit 34.

When inversion command φ5 is received from switching controller 17, converter control circuit 30 controls the inversion in converter 5 based on (i) the output signals of current transformer 32 and voltage detection circuit 31 and (ii) sinusoidal wave signal φ38 from sinusoidal wave generation circuit 38. Specifically, when selection signal φ23 is at the H level, after detecting the power failure of AC power source 50, sinusoidal wave generation circuit 38 generates a sinusoidal wave signal having commercial frequency and predetermined amplitude, in synchronization with the three-phase AC voltage having been supplied from AC power source 50 before the occurrence of the power failure. On the other hand, when selection signal φ23 is at the L level, after detecting the power failure of bypass AC power source 51, sinusoidal wave generation circuit 38 generates a sinusoidal wave signal having commercial frequency and predetermined amplitude, in synchronization with the three-phase AC voltage having been supplied from bypass AC power source 51 before the occurrence of the power failure. Converter control circuit 30 performs PWM control onto converter 5 in order to eliminate a deviation between the output signal of voltage detection circuit 31 and sinusoidal wave signal φ38 generated in sinusoidal wave generation circuit 38. Converter 5 converts (i) the DC power stored in battery 53 into (ii) three-phase AC power of commercial frequency. Node N3 is provided with the three-phase AC voltage having commercial frequency and predetermined amplitude, in synchronization with the three-phase AC voltage having been supplied from AC power source 50 or bypass AC power source 51 before the occurrence of the power failure. The three-phase AC power supplied to node N3 is led to contactor 14 via contactor 16.

During the execution of the eco-mode, when starting command φ9 is received from switching controller 17, inverter control circuit 34 outputs the gate signal generated through the PWM control to inverter 9. Accordingly, inverter 9 converts (i) the DC power stored in battery 53 into (ii) the three-phase AC power of commercial frequency. Inverter 9 outputs the three-phase AC voltage that has commercial frequency and predetermined amplitude that is in synchronization with the three-phase AC voltage having been supplied from AC power source 50 or bypass AC power source 51 before the occurrence of the power failure. The three-phase AC voltage output from inverter 9 is supplied to output terminal T4.

Switching controller 17 sets control signal φC at the L level to turn off contactor 14. The primary side of contactor 14 is provided, via node N1, with the three-phase AC voltage synchronized to the three-phase AC voltage having been supplied from AC power source 50 or bypass AC power source 51 before the occurrence of the power failure. On the other hand, the secondary side of contactor 14 is provided, via output terminal T4, with the three-phase AC voltage synchronized to the three-phase AC voltage having been supplied from AC power source 50 or bypass AC power source 51 before the occurrence of the power failure. Contactor 14 is brought into the state in which the electric conduction is interrupted when the voltage of the primary side becomes equal to the voltage of the secondary side. Accordingly, contactor 14 is turned off immediately after the setting of control signal φC at the L level, before the timing which comes every half cycle of the AC and at which the current value becomes zero. Accordingly, until contactor 14 is turned off, the voltage of output terminal T4 can be maintained at the three-phase AC voltage output from inverter 9. Accordingly, when switching from the power supply in the eco-mode to the inverter power supply, the output voltage of output terminal T4 can be prevented from being dropped momentarily. After turning off contactor 14, converter control circuit 30 stops the operation of converter 5 at the timing at which the AC output from converter 5 reaches the zero point.

Further, the uninterruptible power source according to the fourth embodiment can automatically return from the inverter power supply to the power supply in the eco-mode when supply of three-phase AC power from AC power source 50 or bypass AC power source 51 is resumed, i.e., when supply of power is restarted during the execution of the inverter power supply.

Specifically, during the execution of the inverter power supply, when selection signal φ23 is at the H level, switching controller 17 detects power recovery of AC power source 50 based on the output signal of voltage detection circuit 22. On the other hand, when selection signal φ23 is at the L level, switching controller 17 detects power recovery of bypass AC power source 51 based on the output signal of voltage detection circuit 22.

When power recovery of AC power source 50 or bypass AC power source 51 is detected, switching controller 17 generates a starting command for starting converter 5. Switching controller 17 outputs the generated starting command to converter control circuit 30. When converter 5 is started in response to the starting command, converter control circuit 30 generates a gate signal for controlling the rectification in converter 5, and outputs it to converter 5. Accordingly, converter 5 converts (i) the three-phase AC power supplied from AC power source 50 or bypass AC power source 51 after the power recovery into (ii) DC power.

Based on the output signal of voltage detection circuit 22, sinusoidal wave generation circuit 38 generates a sinusoidal wave signal φ38 having commercial frequency and predetermined amplitude, in synchronization with the three-phase AC voltage supplied from AC power source 50 or bypass AC power source 51 after power recovery. Sinusoidal wave generation circuit 38 provides generated sinusoidal wave signal φ38 to inverter control circuit 34.

Inverter control circuit 34 controls the inversion in inverter 9 based on (i) the output signals of current transformer 36 and voltage detection circuit 35 and (ii) sinusoidal wave signal φ38 from sinusoidal wave generation circuit 38. After the power recovery, inverter control circuit 34 gradually synchronizes the three-phase AC voltage output from inverter 9 to the three-phase AC voltage supplied from AC power source 50 or bypass AC power source 51. Specifically, inverter control circuit 34 restricts an amount of change of the voltage command value between control periods to a predetermined upper limit value or less. This upper limit value is fitted through an experiment or the like so as not to affect the operation of load 52, for example.

Inverter control circuit 34 detects whether or not the three-phase AC voltage detected by voltage detection circuit 35 is in synchronization with the three-phase AC voltage supplied from AC power source 50 or bypass AC power source 51, and provides switching controller 17 with a synchronization detection signal φ34 indicating the detected result. When the three-phase AC voltage detected by voltage detection circuit 35 is in synchronization with the three-phase AC voltage supplied from AC power source 50 or bypass AC power source 51, synchronization detection signal φ34 is set at the H level, which is an activation level. On the other hand, when the three-phase AC voltage detected by voltage detection circuit 35 is not in synchronization with the three-phase AC voltage from AC power source 50 or bypass AC power source 51, synchronization detection signal φ34 is set at the L level, which is a deactivation level.

When synchronization detection signal φ34 is activated at the H level, switching controller 17 sets control signal φD at the H level in order to turn on thyristor switch 13. Next, switching controller 17 sets control signal φC at the H level in order to turn on contactor 14. After passage of a predetermined response time from the setting of control signal φC at the H level, contactor 14 actually becomes on. Then, switching controller 17 sets control signal φD at the L level in order to turn off thyristor switch 13.

Further, inverter control circuit 34 stops the output of the gate signal to the gate drive circuit provided in inverter 9, thereby stopping the operation of inverter 9. Accordingly, the three-phase AC power is supplied from bypass AC power source 51 to load 52 via contactor 14.

In this way, when supply of power from AC power source 50 or bypass AC power source 51 is restarted, inverter control circuit 34 controls inverter 9 to synchronize (i) the three-phase AC voltage output from inverter 9 to (ii) the three-phase AC voltage supplied from AC power source 50 or bypass AC power source 51 after the power recovery. Further, when the three-phase AC voltage output from inverter 9 synchronizes to the three-phase AC voltage supplied from AC power source 50 or bypass AC power source 51, switching controller 17 switches from inverter power supply to the power supply in the eco-mode by turning on thyristor switch 13 and contactor 14. Accordingly, when returning from the inverter power supply to the power supply in the eco-mode, the three-phase AC voltage supplied to load 52 can be prevented from being varied.

After the operation mode of the uninterruptible power source is returned to the eco-mode, inverter control circuit 34 continues to generate, through the PWM control, the gate signal for turning on/off the semiconductor switching element included in inverter 9. However, inverter control circuit 34 does not output the generated gate signal to inverter 9. Accordingly, inverter 9 is not operated during the execution of the eco-mode, and is in the standby state.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: housing; 2, 7, 12, 14, 15, 16: contactor; 3, 6: fuse; 4, 10: reactor; 5: converter; 8: electrolytic capacitor; 9: inverter; 11: capacitor; 13: thyristor switch; 17: switching controller; 18: eco-mode setting unit; 19: power conversion controller; 20, 21, 22, 31, 33, 35: voltage detection circuit; 23: power source selection unit; 30: converter control circuit; 32, 36: current transformer; 34: inverter control circuit; 50: AC power source; 51: bypass AC power source; 52: load; 53: battery; 54: electric double layer capacitor; 60, 62, 64, 65, 66, 67: interrupter; 61, 63: transformer; 68: power line; 70: input/output panel.

The invention claimed is:

1. An uninterruptible power source connected between (i) each of an AC power source and a bypass AC power source and (ii) a load, the uninterruptible power source comprising:
an input terminal configured to receive AC power from the AC power source;
a bypass terminal configured to receive AC power from the bypass AC power source;
an output terminal configured to output AC power to the load;
a converter configured to rectify the AC power provided to the input terminal into DC power;
an inverter configured to invert DC power output by the converter or DC power output by a power storage device into AC power, and to output the AC power to the output terminal;
a power conversion controller configured to control the power conversion in each of the converter and the inverter;
a bypass switch having one terminal connected to the output terminal;
a first switch connected between the bypass terminal and the other terminal of the bypass switch;
a second switch connected between (i) a first node located between the input terminal and an AC terminal of the converter and (ii) the other terminal of the bypass switch;
a third switch connected between the input terminal and the first node; and
a switching controller configured to control on/off of the bypass switch and the first to third switches,
the uninterruptible power source having (i) a first operation mode in which AC power is supplied from the inverter to the load and (ii) a second operation mode in which AC power is supplied from the AC power source or the bypass AC power source to the load via the bypass switch, the uninterruptible power source being configured to change over to the first operation mode when power failure occurs to stop supply of the AC power from the AC power source or the bypass AC power source during the second operation mode,
during the second operation mode, the switching controller being configured to (i) turn on the bypass switch, the second switch, and one of the first and third switches in a normal state in which the AC power is normally supplied from the AC power source or the bypass AC power source, and (ii) turn off the bypass switch during the power failure,
when turning off the bypass switch by the switching controller, the power conversion controller being configured to (i) control the converter to invert the DC power output by the power storage device into AC power and output the AC power to the first node, (ii) control the inverter to invert the DC power output by the power storage device into AC power and output the AC power to the output terminal, and (iii) control the inversions in the converter and the inverter such that phase and magnitude of an AC voltage output to the first node become equal to phase and magnitude of an AC voltage output to the output terminal.

2. The uninterruptible power source according to claim 1, wherein the bypass switch includes a contactor having one terminal connected to the output terminal and having the other terminal connected to the first and second switches.

3. The uninterruptible power source according to claim 1, wherein in the second operation mode, the switching controller is configured to supply the load with the AC power supplied from the AC power source by turning on the bypass switch and the second and third switches and turning off the first switch.

4. The uninterruptible power source according to claim 3, wherein when turning off the bypass switch by the switching controller, the power conversion controller is configured to (i) control the inversion in the converter to synchronize the AC voltage output to the AC terminal of the converter to the AC voltage having been supplied from the AC power source before the power failure, and (ii) control the inversion in the converter to synchronize the AC voltage output to the output terminal to the AC voltage having been supplied from the AC power source before the power failure.

5. The uninterruptible power source according to claim 4, wherein
the power conversion controller is configured to generate a gate signal for controlling the inverter to synchronize the AC voltage output to the output terminal to the AC voltage supplied from the AC power source, and
in the second operation mode, the power conversion controller is configured to (i) bring the inverter into an inversion standby state by stopping output of the gate signal in the normal state, and (ii) output the gate signal to the inverter when turning off the bypass switch by the switching controller.

6. The uninterruptible power source according to claim 3, wherein
when power recovery occurs to resume the supply of the AC power from the AC power source after changing over to the first operation mode, the uninterruptible power source is configured to return to the second operation mode,
in response to detecting the power recovery of the AC power source, the power conversion controller is configured to control the converter to perform the rectification and control the inversion in the inverter to synchronize the AC voltage output to the output terminal to the AC voltage supplied from the AC power source after the power recovery, and the switching controller is configured to turn on the bypass switch when the AC voltage output to the output terminal synchronizes to the AC voltage supplied from the AC power source after the power recovery.

7. The uninterruptible power source according to claim 1, wherein in the second operation mode, the switching controller is configured to supply the load with the AC power supplied from the bypass AC power source by turning on the bypass switch and the first and second switches and turning off the third switch.

8. The uninterruptible power source according to claim 7, wherein when turning off the bypass switch by the switching controller, the power conversion controller is configured to (i) control the inversion in the converter to synchronize the AC voltage output to the AC terminal of the converter to the AC voltage having been supplied from the bypass AC power source before the power failure, and (ii) control the inversion in the inverter to synchronize the AC voltage output to the output terminal to the AC voltage having been supplied from the bypass AC power source before the power failure.

9. The uninterruptible power source according to claim 8, wherein
the power conversion controller is configured to generate a gate signal for controlling the inverter to synchronize the AC voltage output to the output terminal to the AC voltage supplied from the bypass AC power source, and
in the second operation mode, the power conversion controller is configured to (i) bring the inverter into an inversion standby state by stopping output of the gate signal in the normal state, and (ii) output the gate signal to the inverter when turning off the bypass switch by the switching controller.

10. The uninterruptible power source according to claim 7, wherein
when power recovery occurs to resume the supply of the AC power from the bypass AC power source after changing over to the first operation mode, the uninterruptible power source is configured to return to the second operation mode,
in response to detecting the power recovery of the bypass AC power source, the power conversion controller is configured to control the converter to perform the rectification and control the inversion in the inverter to synchronize the AC voltage output to the output terminal to the AC voltage supplied from the bypass AC power source after the power recovery, and
the switching controller is configured to turn on the bypass switch when the AC voltage output to the output terminal synchronizes to the AC voltage supplied from the bypass AC power source after the power recovery.

11. The uninterruptible power source according to claim 1, further comprising a reactor having one terminal connected to the input terminal and having the other terminal connected to the AC terminal of the converter, wherein
the first node is located between the other terminal of the reactor and the AC terminal of the converter.

12. The uninterruptible power source according to claim 1, further comprising a reactor having one terminal connected to the input terminal and having the other terminal connected to the AC terminal of the converter, wherein
the first node is located between the input terminal and the one terminal of the reactor.

13. The uninterruptible power source according to claim 12, further comprising:
a first transformer connected between the AC power source and the input terminal; and
a second transformer connected between the bypass AC power source and the bypass terminal.

* * * * *